(12) United States Patent
Shekhar et al.

(10) Patent No.: US 10,665,030 B1
(45) Date of Patent: May 26, 2020

(54) VISUALIZING NATURAL LANGUAGE THROUGH 3D SCENES IN AUGMENTED REALITY

(71) Applicant: Adobe Inc., San Jose, CA (US)

(72) Inventors: Sumit Shekhar, Bengaluru (IN); Paridhi Maheshwari, Bengaluru (IN); Monisha J, Bangalore (IN); Kundan Krishna, Khairachatar (IN); Amrit Singhal, Lucknow (IN); Kush Kumar Singh, Garhwa (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/247,235

(22) Filed: Jan. 14, 2019

(51) Int. Cl.
*G06T 19/00* (2011.01)
*G06F 40/40* (2020.01)

(52) U.S. Cl.
CPC .......... *G06T 19/006* (2013.01); *G06F 40/40* (2020.01); *G06T 2200/04* (2013.01)

(58) Field of Classification Search
None
See application file for complete search history.

(56) References Cited

U.S. PATENT DOCUMENTS

| | | | | |
|---|---|---|---|---|
| 7,016,828 | B1* | 3/2006 | Coyne | G06F 17/212 704/9 |
| 9,035,955 | B2* | 5/2015 | Keane | G10L 21/10 345/419 |
| 9,106,812 | B1* | 8/2015 | Price | G06F 16/40 |
| 9,582,913 | B1* | 2/2017 | Kraft | G06T 11/60 |
| 10,318,559 | B2* | 6/2019 | Duschl | G06F 17/2705 |
| 2013/0321390 | A1* | 12/2013 | Latta | G06T 11/00 345/419 |
| 2016/0203645 | A1* | 7/2016 | Knepp | G06F 16/434 345/633 |

(Continued)

OTHER PUBLICATIONS

Akerberg et al., "CarSim: an automatic 3D text-to-scene conversion system applied to road accident reports", 2001, In Proceedings of the tenth conference on European chapter of the Association for Computational Linguistics—vol. 2, Association for Computational Linguistics, 4 pages.

(Continued)

*Primary Examiner* — Jason A Pringle-Parker
(74) *Attorney, Agent, or Firm* — Finch & Maloney PLLC

(57) ABSTRACT

A natural language scene description is converted into a scene that is rendered in three dimensions by an augmented reality (AR) display device. Text-to-AR scene conversion allows a user to create an AR scene visualization through natural language text inputs that are easily created and well-understood by the user. The user can, for instance, select a pre-defined natural language description of a scene or manually enter a custom natural language description. The user can also select a physical real-world surface on which the AR scene is to be rendered. The AR scene is then rendered using the augmented reality display device according to its natural language description using 3D models of objects and humanoid characters with associated animations of those characters, as well as from extensive language-to-visual datasets. Using the display device, the user can move around the real-world environment and experience the AR scene from different angles.

20 Claims, 19 Drawing Sheets

(56) References Cited

U.S. PATENT DOCUMENTS

| | | | |
|---|---|---|---|
| 2018/0018825 A1* | 1/2018 | Kim | G06F 3/04842 |
| 2018/0356967 A1* | 12/2018 | Rasheed | G06F 3/04847 |
| 2019/0102946 A1* | 4/2019 | Spivack | G06T 19/003 |
| 2019/0155829 A1* | 5/2019 | Schriber | G06F 3/0482 |
| 2019/0304157 A1* | 10/2019 | Amer | G06N 3/0445 |
| 2019/0304192 A1* | 10/2019 | Waye | G06F 16/48 |

OTHER PUBLICATIONS

Billinghurst et al., "The MagicBook—Moving Seamlessly Between Reality and Virtuality", 2001, IEEE Comput. Graph. Appl., pp. 6-8.

Chang et al., "Text to 3D scene generation with rich lexical grounding", arXiv:1505.06289, Jun. 5, 2015, 10 pages.

Chang et al., "Semantic parsing for text to 3D scene generation", 2014, In Proceedings of the ACL 2014 Workshop on Semantic Parsing, pp. 17-21.

Chang et al., "ShapeNet: An Information-Rich 3D Model Repository", arXiv:1512.03012, Dec. 9, 2015, 11 pages.

Chang et al., "Learning Spatial Knowledge for Text to 3D Scene Generation", 2014, In Empirical Methods in Natural Language Processing (EMNLP), pp. 2018-2038.

Collell et al., "Acquiring common sense spatial knowledge through implicit spatial templates", arXiv:1711.06821, Nov. 21, 2017, 8 pages.

Coyne et al., "Annotation tools and knowledge representation for a text-to-scene system", Proceedings of COLING 2012, Dec. 2012, pp. 679-694.

Coyne, B and R Sproat, "WordsEye: an automatic text-to-scene conversion system", In Proceedings of the 28th annual conference on Computer graphics and Interactive techniques, ACM, 2001, pp. 487-496.

Delgado et al., "Virtual cockpit window for the X-38 crew return vehicle", In Enhanced and Synthetic Vision, International Society for Optics and Photonics, 2000, pp. 63-71.

Hassani K and Ws Lee, "Visualizing natural language descriptions: A survey", arXiv: 1607.00623v1, Jul. 3, 2016, 31 pages.

Johansson et al., "Automatic text-to-scene conversion in the traffic accident domain", 2005, in IJCAI, vol. 5, pp. 1073-1078.

Krishna et al., "Visual Genome: Connecting Language and Vision Using Crowdsourced Dense Image Annotations", 2017, Int J Comput Vis, Springer, pp. 32-73.

Lin et al., "Microsoft COCO: Common objects in context", arXiv:1405. 0312v3, Feb. 21, 2015, 15 pages.

Liu Zhi-Qiang, "Script Visualization (ScriptVis): a smart system that makes writing fun", 2003, In Machine Learning and Cybernetics, 2003 International Conference on, vol. 5. IEEE, 14 pages.

Luan et al., "Deep photo style transfer", arXiv:1703.07511v3, Apr. 11, 2017, 9 pages.

Lutridis et al., "ARTutor—An Augmented Reality Platform for Interactive Distance Learning", 2018, Education Sciences, vol. 8, 12 pages.

Macintyre et al., "DART: a toolkit for rapid design exploration of augmented reality experiences", 2004, In proceedings of the 17th annual ACM symposium on User interface software and technology, ACM, 10 pages.

Manning et al., "The Stanford CoreNLP Natural Language Processing Toolkit", 2014, In Proceeings of 52nd Annual Meeting of the Association for Computational Linguistics: System Demonstrations, pp. 55-60.

Nebeling et al., "ProtoAR: Rapid Physical-Digital Prototyping of Mobile Augmented Reality Applications", 2018, In Proceedings of the 2018 CHI Conference on Human Factors in Computing Systems (CHI '18), Article 353, 12 pages.

Pennington et al., "Glove: Global vectors for word representation", 2014, In Proceedings of the 2014 conference on empirical methods in natural language processing (EMNLP), pp. 1532-1543.

Rodas, Nicolas Loy and Nicolas Padoy, "3D global estimation and augmented reality visualization of intra-operative X-ray dose", 2014, In International Conference on Medical Image Computing and Computer-Assisted Intervention, Springer, 8 pages.

Santos et al., "Augmented reality learning experiences: Survey of prototype design and evaluation", 2014, IEEE Transactions on learning technologies, vol. 7, pp. 38-56.

Schuster et al., "Generating Semantically Precise Scene Graphs from Textual Descriptions for Improved Image Retrieval", 2015, In Proceedings of the 2015 Workshop on Vision and Language (VL'15), Association for Computational Linguistics, Lisbon, Portugal, pp. 70-80.

Seichter et al., "ComposAR: An Intuitive Tool for Authoring AR Applications", 2008, In Proceedings of the 7th IEEE/ACM International Symposium on Mixed and Augmented Reality (ISMAR '08), pp. 177-178.

Seversky Lee and Lijun Yin, "Real-time automatic 3D scene generation from natural language voice and text descriptions", 2006, In Proceedings of the 14th ACM international conference on Multimedia, ACM, 4 pages.

Swatman, Rachel, "Pokémon Go catches five new world records", 2016, retrieved from the Internet: http://www.guinnessworldrecords.com/news/2016/8/pokemongo-catches-five-world-records-439327 [retrieved Jun. 18, 2019] 27 pages.

Talbot, Christine, "Directing Virtual Humans Using Play-Scripts and Spatio-Temporal Reasoning", 2018, Ph.D. Dissertation, The University of North Carolina at Charlotte 260 pages.

Dumoulin et al., "A learned representation for artistic style", arXiv:1610. 07629v5, Feb. 9, 2017, 26 pages.

\* cited by examiner

Human-Object Relation Prediction
Girl watching elephant (front view)

Human-Object Relation Prediction
Girl riding elephant (front view)

Human-Object Relation Prediction
Woman holding flying disc (front view)

Object-Object Relation Prediction
Book on table (top view)

Object-Object Relation Prediction
Book on table (front view)

Object-Object Relation Prediction
Bed to front of lamp (top view)

Object-Object Relation Prediction
Bed to front of lamp (front view)

VISUALIZING NATURAL LANGUAGE THROUGH 3D SCENES IN AUGMENTED REALITY

FIELD OF THE DISCLOSURE

This disclosure relates generally to augmented reality (AR) video processing, and more particularly, to techniques for processor-based conversion of a natural language scene description into a three-dimensional (3D) scene in augmented reality.

BACKGROUND

Augmented reality is the integration of digitally created content into the real world, which provides users with a perceptually enhanced visualization of the reality and offers an interactive way of engaging with the surroundings. Augmented reality is rapidly growing in popularity, enhancing the human perception of the real world through augmentation with digital experiences. Various industries have started exploring the possibilities offered by AR and incorporating them into products that improve the user experience. Examples of AR applications include educational tools, medical visualization, navigation and path planning, and gaming. However, there is currently no framework available for processor-based conversion of a natural language scene description into a 3D scene in augmented reality. Moreover, developing engaging and realistic AR experiences using existing tools and techniques requires developers to utilize a significantly high degree of creative skill and artistic talent, putting much AR development out of the reach of the average user.

BRIEF DESCRIPTION OF THE DRAWINGS

The accompanying drawings are not intended to be drawn to scale.

DETAILED DESCRIPTION

Figure 1:
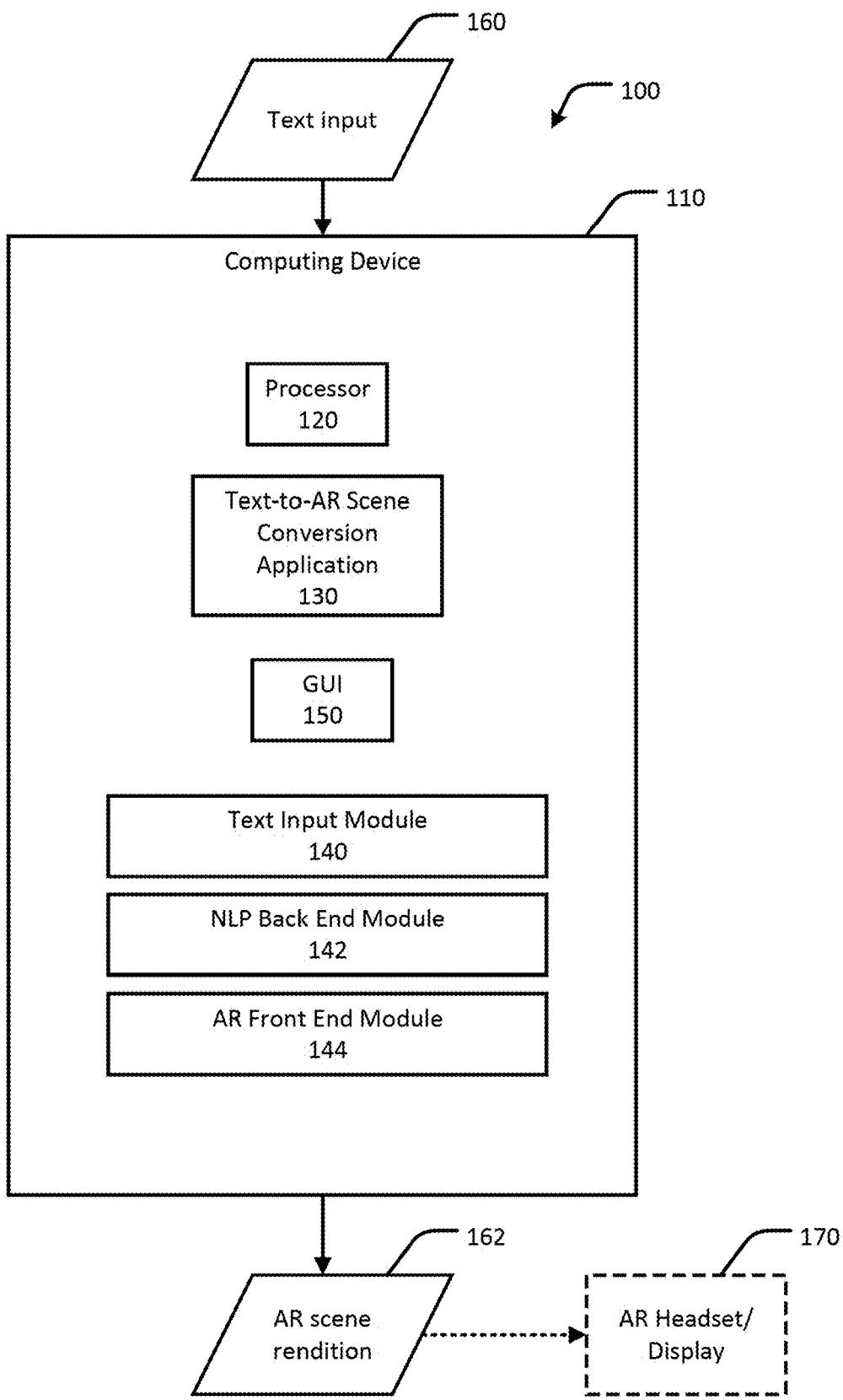
FIG. 1 shows an example system for processor-based conversion of textual input into augmented reality scene renderings, in accordance with an embodiment of the present disclosure.

As noted above, the creation of AR content is at best a non-trivial task that employs extensive creative and artistic ability combined with real-world or domain knowledge. For example, text-based content, such as short stories and comics, can be converted into AR experiences by creative professionals. In some instances, the conversion process may include mapping pre-defined digital augmentations to specific portions of the text-based content. However, this process tends to limit the ability of the user to alter or customize the AR experience, given the reliance on domain-specific information. In some other instances, the conversion process may include positioning objects in an AR scene according to pre-defined relations between the objects and templates that generalize the text-to-visual scene conversion. However, such a technique fails to account for human interactions with the objects as one would expect in an AR experience. Because of such technical constraints, the user-experience may be poor.

To this end, and in accordance with an embodiment of the present disclosure, a natural language scene description, provided as a text input, is converted into a scene that is rendered in 3D by an augmented reality display device. This conversion allows a relatively unskilled user to create an AR scene visualization through natural language text inputs that are easily created and well-understood by the user. The user can, for instance, select a pre-defined natural language description of a scene or manually enter a custom natural language description. The user can also select a physical real-world surface on which the AR scene is to be rendered. The AR scene is then rendered using the augmented reality display device according to its natural language description using 3D models of objects and humanoid characters with associated animations of those characters, as well as from extensive language-to-visual datasets. The display device can include any device configured to generate one or more sensory modalities, such as visual, auditory, haptic, somatosensory, and olfactory. Using the display device, the user can move around the real-world environment and experience the AR scene from different angles, as will be appreciated in view of this disclosure.

These novel techniques address the problem of converting text to an AR scene for the general case—textual input that does not belong to any specific domain—for both static and dynamic AR scenes. There is currently no framework to address this general case. The term domain, in addition to its ordinary and customary definition, includes a text sentence describing any real-world environment of the user. To simplify the AR creation process for the user, the disclosed techniques employ a learning framework that maps natural language text to AR scenes using 3D object models, such that easily understood, plain language inputs are recognized and converted into corresponding virtual elements rendered in AR. The natural language input can describe static and dynamic (animated) scenes both explicitly, where the spatial and size relationships between objects are defined by the textual description, and implicitly, where objects that are not explicitly described can instead be gleaned from models and machine learning. The disclosed techniques use deep learning (also known as deep structured learning or hierarchical learning in the context of machine learning methods) to predict the relative sizes and the relative positions of the objects in the scene with respect to each other. More specifically, any dataset (also referred to herein as "pre-defined training data") having a large set of images with tagged object boxes and defined relationships between the images, such as the Stanford Visual Genome dataset, is used for training models that predict the size and position for relations involving humans or animals. Also, a three-layered neutral network is trained on a dataset (also referred to herein as "pre-defined training data") of 3D scenes and text describing the relations between objects in the scenes, such as the Stanford Text2Scene dataset, for relations involving only objects. The models are then used to infer the relative size and position of the objects or entities in the scene described by the natural language description, and this information is used to render those objects/entities in the AR scene at the appropriate scale and location. Further, a two-dimensional (2D) background image can be added to describe parts of the scene that cannot be described sufficiently through the 3D object models. The disclosed techniques can be implemented in a mobile device user interface, where the user enters, selects or otherwise provides a natural language description of the AR scene via the user interface, and then views the AR scene using the device, thus providing a real-time AR creation experience.

System Architecture

FIG. 1 shows an example system 100 for processor-based conversion of textual input into augmented reality scene renderings, in accordance with an embodiment of the present disclosure. The system 100 includes a computing device 110 having a processor 120, a Text-to-AR Scene Conversion Application 130, and a graphical user interface (GUI) 150. The GUI 150 includes a display and text input device and can be extended to optionally include an AR headset 170 or other AR display device. The processor 120 of the computing device 110 is configured to execute Text Input Module 140, a Natural Language Processing (NLP) Back End Module 142, and an Augmented Reality (AR) Front End Module 144, each of which is described in further detail below. The computing device 110 is further configured to receive, as an input, a text input 160. The text input 160 can include a natural language description of an AR scene to be rendered by the system 100. The computing device 110 is further configured to produce, as an output, an AR scene rendition 162 that is based at least in part on text input 160. The AR scene rendition 162 depends on several things, including one or more object-to-object relation models and one or more object-to-human relation models, such as variously described in this disclosure.

As described in further detail below with respect to, for example, FIGS. 5 and 9-13, the Text-to-AR Scene Conversion Application 130 is generally configured to perform one or more of the following functions: scene graph generation, scene augmentation, size and position prediction, animation and background inference, and AR scene rendition.

As used in this disclosure, the phrase "augmented reality" is different from the phrase "scene augmentation." Augmented reality refers to an interactive experience, by a human user, of a real-world environment that is digitally augmented by computer-generated perceptual information. The computer-generated perceptual information can, for example, include visual, auditory, haptic, somatosensory, or olfactory effects that are not actually present in the real-world environment. By augmenting the real-world environment with computer-generated perceptual information, the user experiences an artificially enhanced environment.

In contrast to augmented reality, as used in this disclosure, the phrase "scene augmentation" refers to, among other things, a process of adding (augmenting) computer-generated perceptual information, such as objects and backgrounds, to a scene that already includes at least some computer-generated perceptual information. As will be discussed in further detail below, while the text input includes explicit descriptions of certain entities and relationships between entities, the scene can be augmented with additional entities that are not explicitly described by the text input. A benefit of scene augmentation is that it provides an AR experience that is richer than it would be without such augmentation. However, it will be understood that the amount of scene augmentation is somewhat dependent on the level of detail provided in the natural language description of the scene, may be limited or otherwise controlled by the user as desired, and may not be necessary in all cases.

Figure 2:
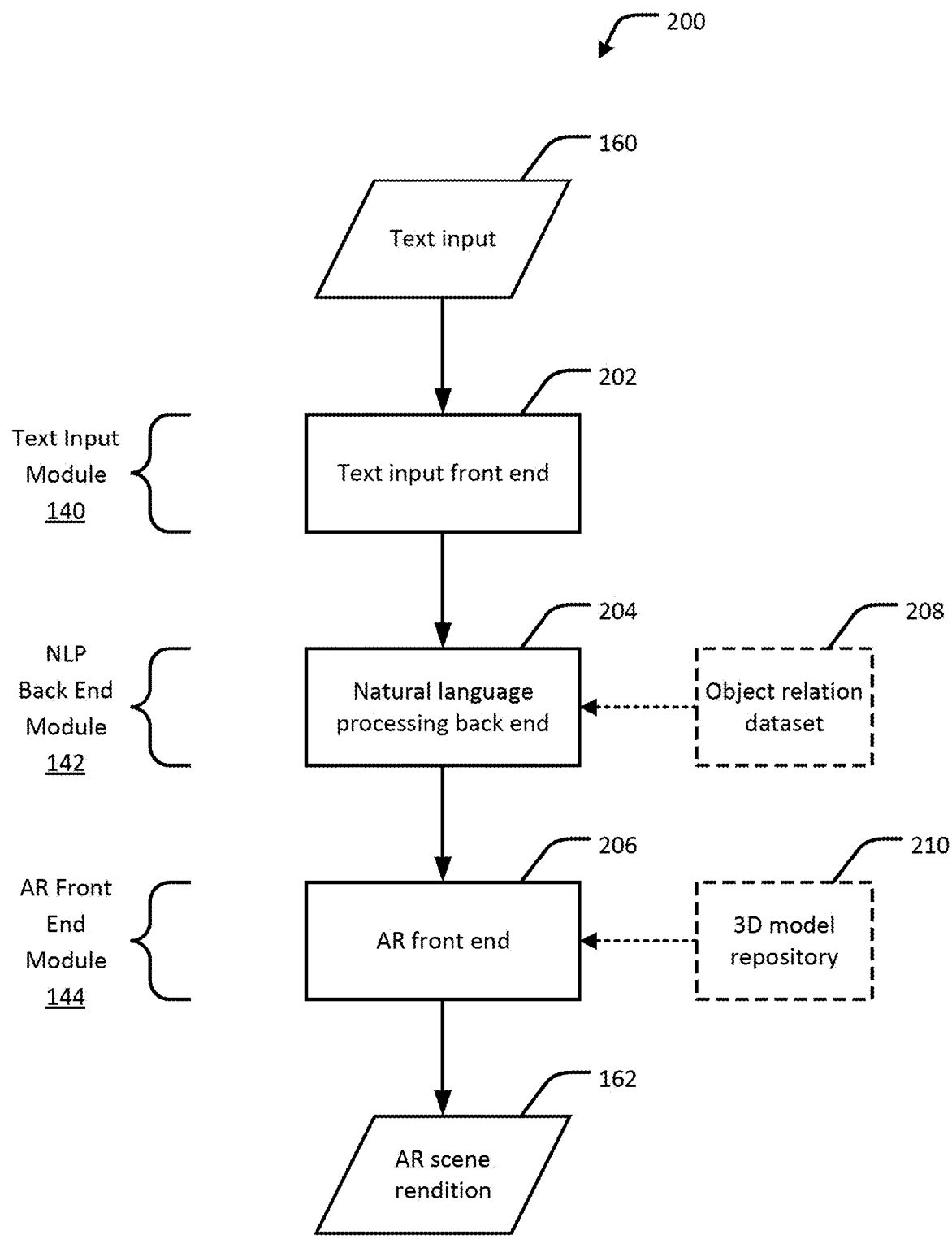
FIG. 2 is a process flow diagram of an example method for processor-based conversion of textual input into an augmented reality experience, in accordance with an embodiment of the present disclosure.

FIG. 2 is a process flow diagram of an example method 200 for processor-based conversion of textual input into an augmented reality experience, in accordance with an embodiment of the present disclosure. The Text Input Module 140 is generally configured to provide a text input front end 202 to the NLP Back End Module 142. In more detail, the text input front end 202 provides the user interface 150 for selecting or entering the text input 160, which represents a natural language scene description of an AR scene to be rendered, such as described below with respect to FIGS. 3 and 4.

Still referring to FIG. 2, the NLP Back End Module 142 is configured to convert the text input received by the text input front end 202 into a scene graph representing objects and object relations in the scene described by the text input, to augment the scene with additional information not explicitly described by the text input, to predict the relative size and the relative position of the objects in the scene, and to infer animations and backgrounds that are not explicitly described by the text input. Various object-to-object relation datasets 208 and object-to-human relation datasets are used to predict the relative size and the relative position of objects in the scene. For example, the datasets can include any dataset having a large set of images with tagged object boxes and defined relationships between the images, such as the Stanford Visual Genome dataset, or a dataset of 3D scenes and text describing the relations between objects in the scenes, such as the Stanford Text2Scene dataset. Other datasets or object models can be used to augment the scene with additional entities as well as to infer animations and backgrounds that are appropriate for the entities explicitly or implicitly described by the text input.

The AR Front End Module 144 is configured to render the AR scene produced by a natural language processing back end 204 using one or more 3D models 210, thereby providing the AR scene rendition 162. The AR Front End Module 144 is configured to render the AR scene on various surfaces of objects in the real-world environment (for example, rendering an image of a computer-generated lamp such that it appears on the top of a physical table in the real-world environment of the user).

Text Input Front End

Figure 3:
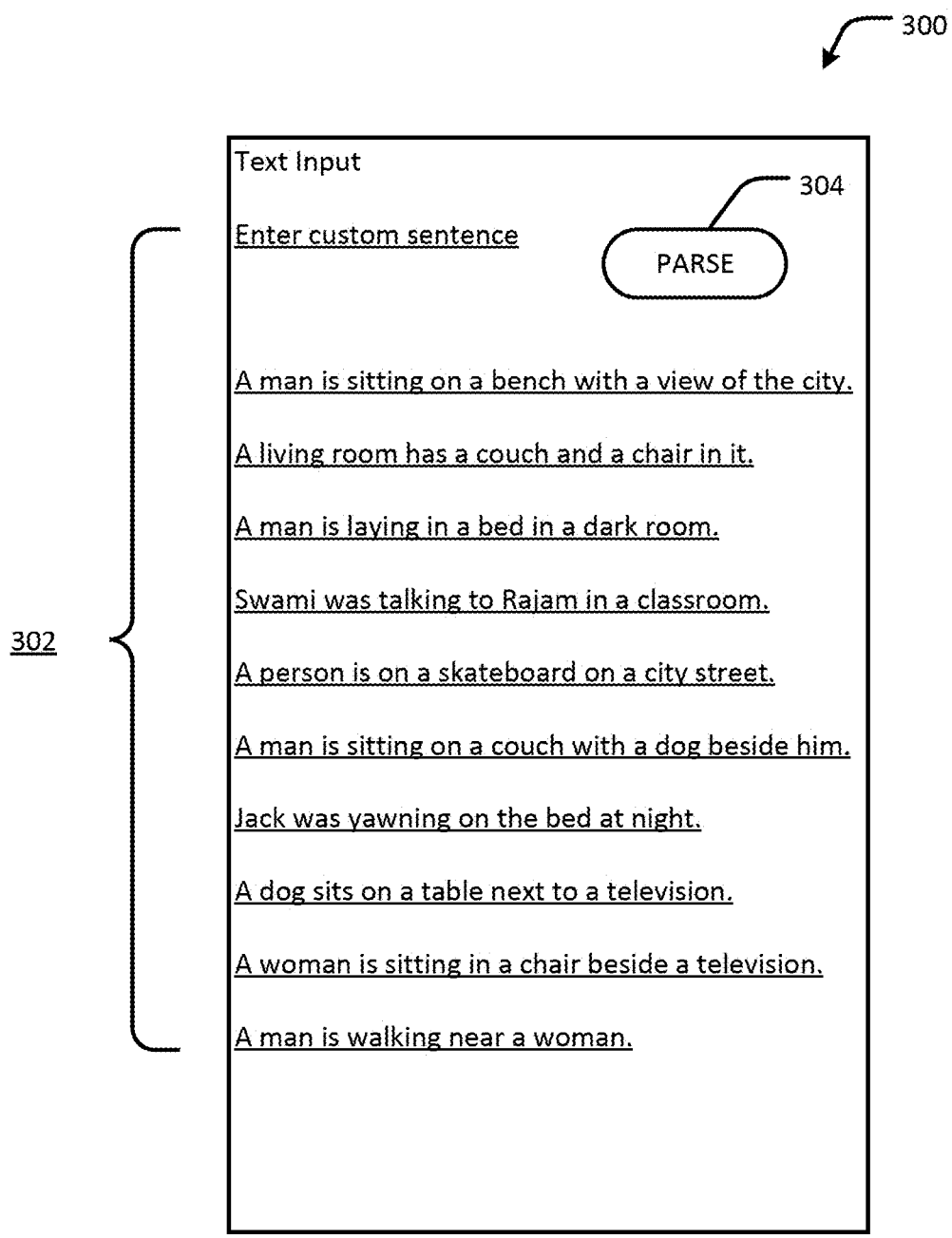
FIG. 3 shows an example user interface for textual input, in accordance with an embodiment of the present disclosure.
Figure 4:
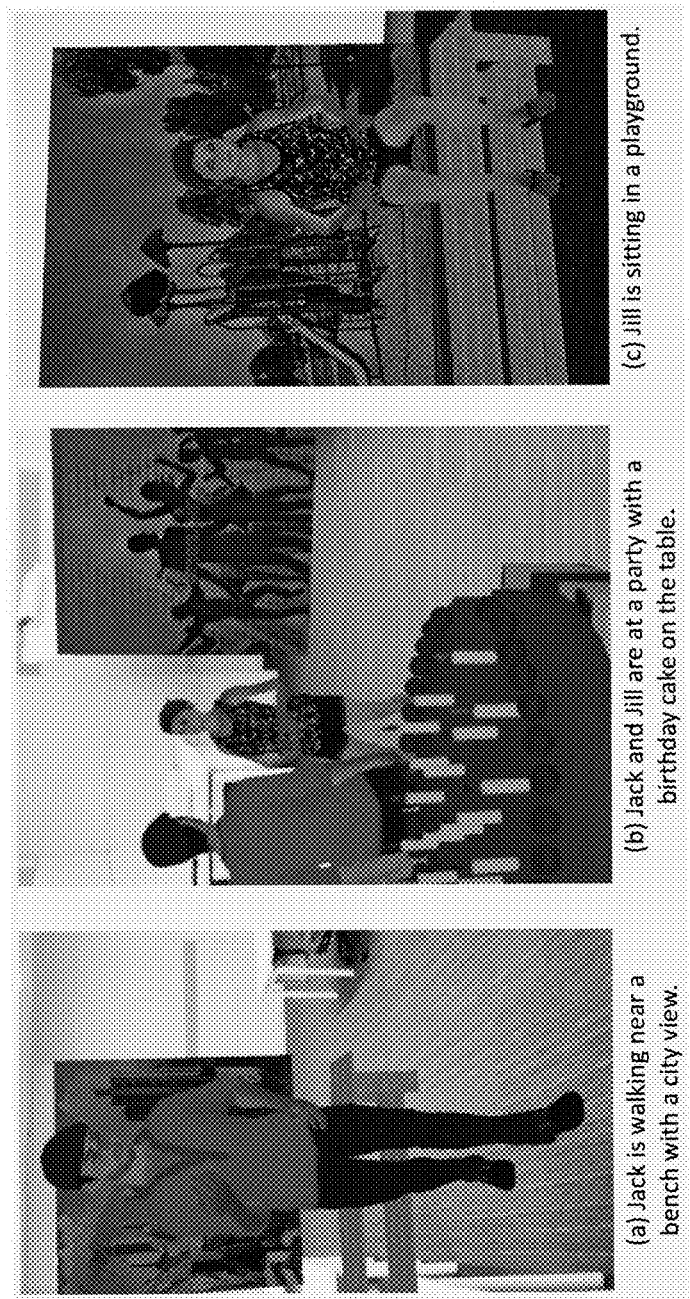
FIG. 4 shows several example snapshots of AR scenes corresponding to natural language descriptions of those scenes.

FIG. 3 shows an example user interface 300 that can be implemented as part of the text input front end 202 of FIG. 2. FIG. 4 shows several example snapshots of AR scenes corresponding to natural language descriptions of those scenes, as input via the user interface 300 of FIG. 3. The text input front end 202 provides a user interface, such as the example user interface 300 of FIG. 3, for entering the natural language description(s) of the AR scene to be rendered. The text input front end 202 can be implemented using the GUI 150 (GUI) of the computing device 110 of FIG. 1 or by any text-based interface of, or connected to, the computing device 110. More particularly, the user interface 300 receives a natural language scene description as the text input 160 and provides the AR scene rendition 162 as the output.

The GUI 300 is configured to permit a user to enter a natural language scene description of the AR scene or to select from a pre-defined list of natural language scene descriptions. Text can be entered or selected, for example, via any suitable type of input device, such as a keyboard, a touch screen, or voice recognition circuitry, as will be appreciated in view of this disclosure. The user interface 300 of FIG. 3 includes one or more fields 302 for inputting or selecting a sentence that describes, in natural language (such as English, French, Spanish, etc.), one or more objects and people in the scene, and relationships between those objects and people. One example of a natural language description of an AR scene is: "A man is sitting on a bench." Further non-limiting examples of a natural language description of an AR scene include:

"A man is sitting on a bench with a view of the city."
"A living room has a couch and a chair in it."
"A man is laying in a bed in a dark room."
"Swami was talking to Rajam in a classroom."
"A person is on a skateboard on a city street."
"A man is sitting on a couch with a dog beside him."
"Jack was yawning on the bed at night."
"A dog sits on a table next to a television."
"A woman is sitting in a chair beside a television."
"A man is walking near a woman."

Other natural language descriptions that can be entered via the user interface 300 as will be apparent in view of this disclosure.

The sentence entered or selected by the user via the user interface 300 becomes the text input 160 into the system 100. Each of the text inputs 160 describe at least a portion of the scene to be rendered in AR by performing the method 200, such as shown in the examples of FIG. 4. For example, FIG. 4 shows AR scene renditions of "Jack is walking near a beach with a city view," "Jack and Jull are at a party with a birthday cake on the table," and "Jill is sitting in a playground." Other AR scene rendition examples will be apparent in view of this disclosure. After the user enters the text, the text input 160 is parsed and converted into a scene graph using any suitable natural language processing techniques as implemented in the natural language processing back end 204. For example, the text parsing can be initiated manually when the user selects a "parse" button 304 in the GUI 300, triggering the natural language processing back end 204 to process the input.

Natural Language Processing Back End

Figure 5:
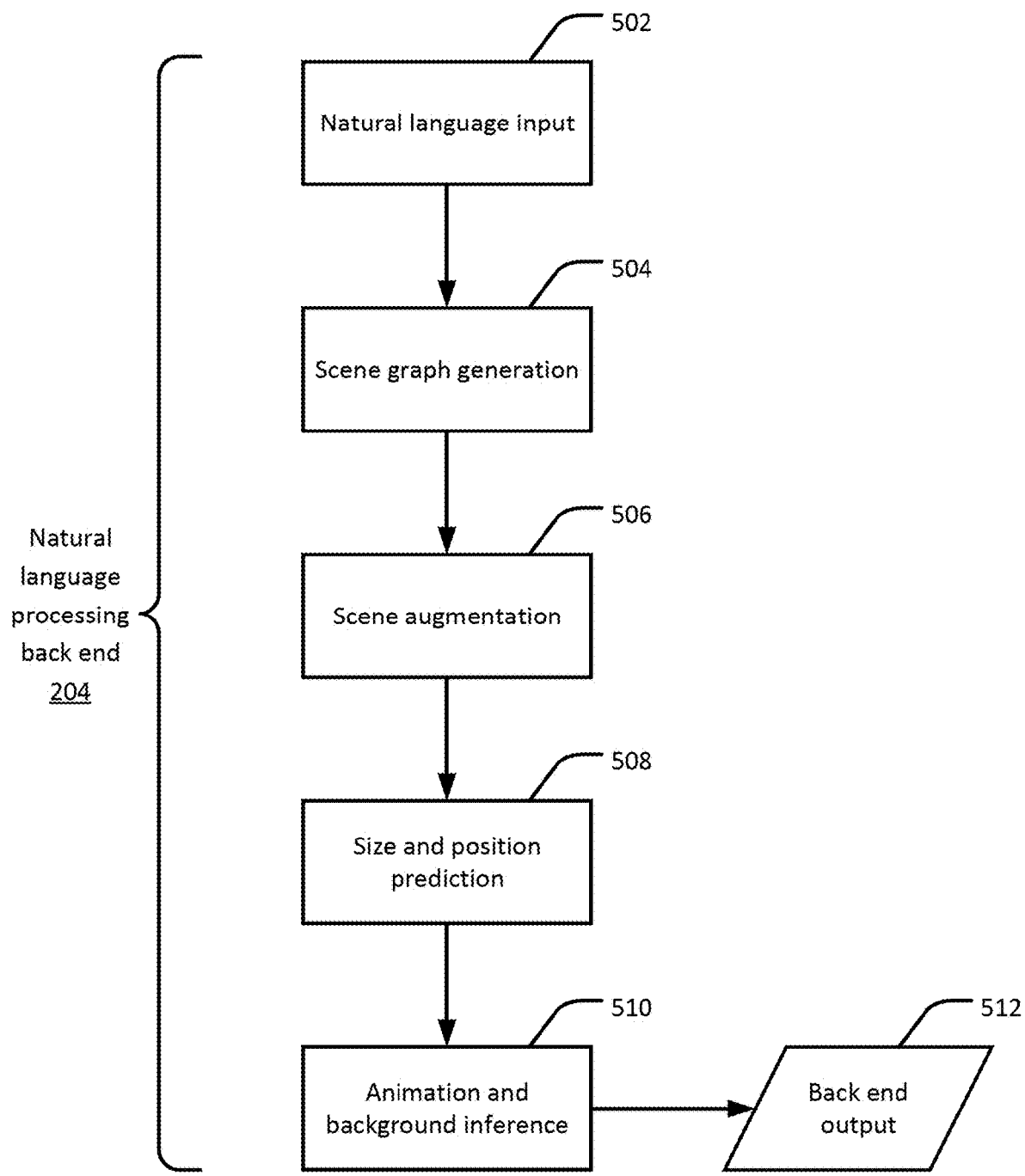
FIG. 5 is a generalized process flow diagram of a natural language processing back end, in accordance with an embodiment of the present disclosure.

FIG. 5 is a generalized process flow diagram of the natural language processing back end 204, in accordance with an embodiment of the present disclosure. As shown in FIG. 2, the natural language processing back end 204 lies between the text input front end 202 and the AR front end 206 in the overall process and performs several functions. Initially, the natural language processing back end 204 processes a natural language input 502, such as the text input 160 received via the text input front end 202. The natural language input 502 includes a natural language description of an AR scene to be rendered, such as described with respect to FIGS. 3 and 4. The natural language input 502 is converted to a scene graph by scene graph generation 504 using one or more language-to-visual datasets that describe a wide variety of entities and common relations between those entities. The scene graph represents each of the entities in the described scene and the relations between those entities. Entities can include virtual representations of inanimate objects and living things, such as humans or animals.

Next, to enhance the AR experience for the user, the scene can be augmented 506 with information that is not explicitly stated in the natural language input 502 but can be implicitly reasoned from it. The amount of augmentation depends on the amount of detail in the natural language input 502. For example, a highly detailed scene description may not benefit from much, if any, augmentation because the description is rich enough on its own (e.g., "A man sitting on a wooden bench under a shade tree and reading a book in a garden on a warm sunny day."). By contrast, it may be possible to augment a scene description with very low detail by finding an object having a high co-occurrence satisfying the relation (e.g., "A man sitting" will be augmented with a chair, since "chair" has a high co-occurrence with "man" for the relation "sitting"). However, in some cases, scene augmentation may not occur.

Next, the relative size and the relative position of objects in the scene are predicted 508 using one or more predictive models. These predicted sizes and positions will be used for rendering the objects in the AR scene at appropriate scales.

Next, entities such as humanoids are animated 510, wherein animation is inferred from the natural language scene description, and, if possible, a background image is inferred from the natural language scene description. The data resulting from the natural language processing back end 204 is then provided as back end output 512 for use by the AR front end 206, where the AR scene is rendered.

Scene Graph Generation

A scene graph is a graphical representation of natural language text, where each node in the graph corresponds to objects or other entities referenced in the text. The scene graph includes two types of edges: attribute edges, which describe some aspect of the objects/entities, and relation edges, which describe spatial and size relationships between objects/entities. A relation in a scene graph is a labeled, directed edge from one object/entity to another. Scene graph generation involves the following:

(a) Splitting complex sentences: Stanford CoreNLP Toolkit is used to obtain constituency parses of the complex sentence, and the sentence is split at tags (such as 'S', 'SBAR', etc.) that represent partial sentences.

(b) Co-reference handling: Stanford CoreNLP Toolkit is used to perform co-reference resolution, followed by replacement of co-referent mentions with the representative mention.

(c) Scene Graph Parsing: The Stanford Scene Graph Parser is used to parse the final sentences into scene graphs.

Figure 6:
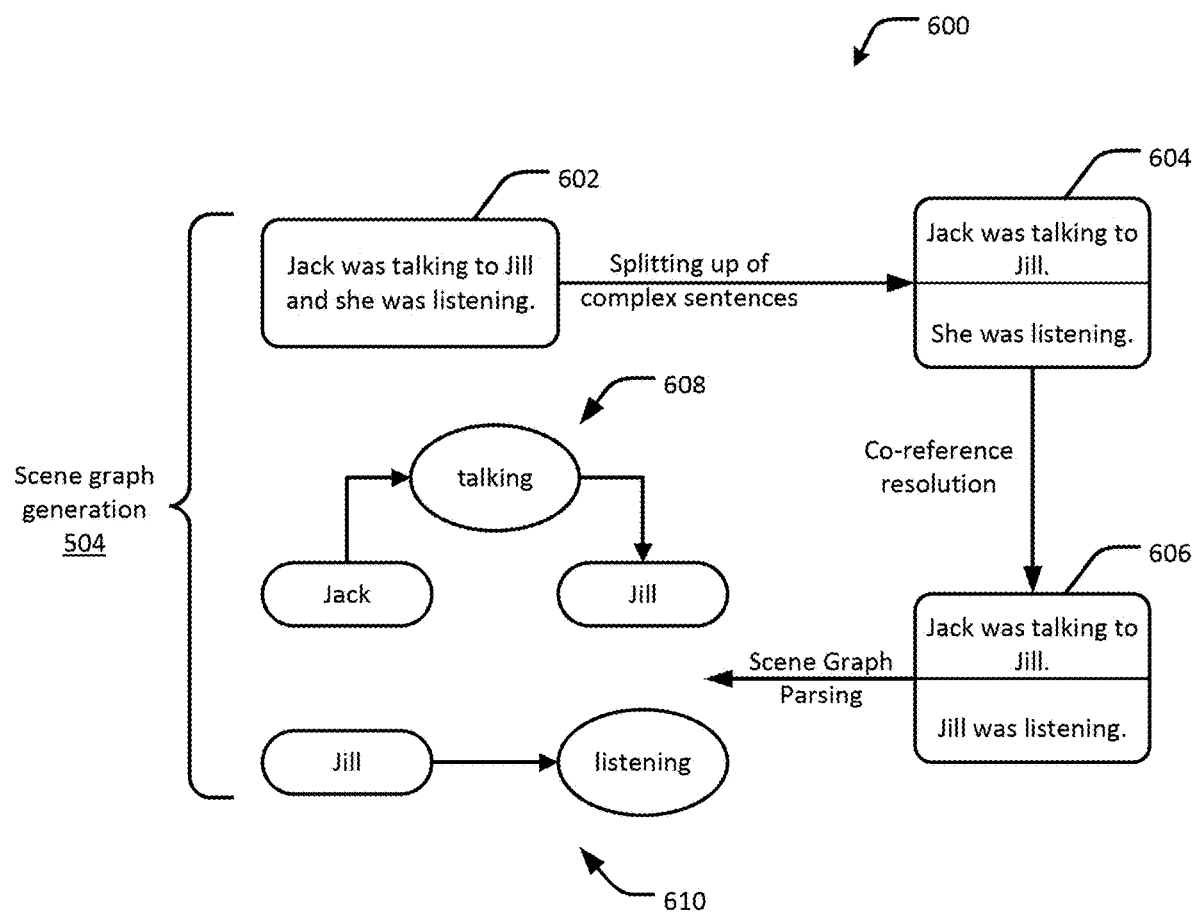
FIG. 6 shows an example extended scene graph, in accordance with an embodiment of the present disclosure.

FIG. 6 shows an example extended scene graph 600, in accordance with an embodiment of the present disclosure. The extended scene graph 600, as produced by the scene graph generation 504, includes nodes 608 and 610 that represent the objects described by the natural language input 502 that are to be rendered in the AR space. First, if a natural language scene description 602 is a complex sentence, it is split into two or more simple sentences 604. Co-references in the simple sentences 604 are then resolved as needed into sentences 606 ready for parsing into the scene graphs 608 and 610. The directed edges or relationships between the nodes (objects) in the extended scene graph 600, which are represented by arrows in FIG. 6, are used to predict the relative sizes and positions of all the entities in the scene and to infer animations that are applied to human figures, such as described in further detail below.

Scene Augmentation

Since the natural language input 502 may not describe all objects potentially in the scene, the scene graph 600 could be missing certain information that is not explicitly stated in the natural language text, but however can be implicitly reasoned from it. In such instances, the scene graph 600 can be augmented with implicit prior knowledge about the real world to generate an extended scene graph that includes objects or other entities not explicitly described in the natural language scene description. For example, referring to FIG. 4, the scene described by "Jill is sitting in a playground" does not explicitly define what Jill is sitting on. However, the word "playground" provides an implicit reference to objects that are likely to be found in a playground, such as a bench. Thus, the scene described by "Jill is sitting in a playground" can be augmented with a bench, and Jill can be rendered sitting on the bench in the AR scene. The scene augmentation occurs at step 506.

Several types of scene augmentation can be used to generate the information that is missing from the scene graph, such as follows:

(a) Adding additional objects to the scene by taking into consideration the objects whose presence have been explicitly mentioned in the scene. For instance, if a scene includes a chair, then a table could also be present in the scene even if the table is not explicitly mentioned in the text. This is modeled using P(O, R|S), which in turn is obtained using a count-based probability measure over an object relation dataset 208, such as the Visual Genome dataset. The object relation pair (O, R) to be added to S is determined as (O*, R*) such that:

$$(O^*, R^*) = \underset{(O,R)}{\mathrm{argmax}}\, P(O, S \mid R)$$

The relation-object (O*, R*) is augmented to S, if P(O*, R*|S) crosses the threshold probability value t, which is fixed by experimentation. This value controls the extent to which augmentation is performed. While adding (O*, R*) to S, it is ensured that S does not already have a relationship R* attached to it, either pointed to object O*, or to some other object O'. If such a scenario arises, augmentation is ignored to avoid repetition of explicitly stated relationships. Note that when using very large datasets, the search space for augmentation of scene graphs can be restricted to, for example, the top 100 most frequently occurring objects in the dataset.

(b) Inferring non-existent relations between objects that are present in the scene. For instance, if a man and a chair are two of the objects in the scene as described by the text, 'sit on' could be a highly plausible relation from the man to the chair. In another example, in the sentence 'A man is sitting', man is the subject and sit is an attribute of this object. An object, such as a chair, can be augmented to the scene based on the attribute to indicate where the man is sitting. External knowledge about the real world is used to augment the scene in this manner. The attribute of the object nodes in the scene graph are checked whether they are present as a relationship for that object in the Visual Genome dataset. If present as a relationship predicate, then the attribute can be changed to relationship R with the object O*:

$$O^* = \underset{(O)}{\mathrm{argmax}}\, P(O \mid S, R)$$

The triplet (S, R, O*) is formed, if P(O*|S,R) crosses t, where t is a threshold parameter set after experimentation. If no such O* exists, no augmentation is performed. In the former example, the attribute 'sits' is augmented with the object 'chair'.

Prediction of Positions and Sizes

Next, the positions and sizes of objects relative to other objects are predicted based on the relations between them. The size and position predictions occur at step 508. A neural network is a type of training model that can be used for size and position prediction.

(a) Model for Human—Object Pair: For predicting position and size for relations with humans as one of the entities in the AR scene, potential relationships are extracted from the object relation dataset 208, for example, the Visual Genome Dataset. A three-layered neural network is trained on text embeddings of the object and human and the position and size of the first object, to predict the position and size of the second object.

It is a challenging task to capture 3D scenes for common human/animal actions, and no existing 3D scene dataset can handle such cases. Hence, for predicting size/position for relations involving humans or animals, 2D bounding boxes from any dataset having a large set of images with tagged object boxes and defined relationships between the images are used for training, and heuristically extended to obtain 3D bounding boxes. A multi-layered perceptron is trained to predict the position and size-scale of the object given the subject and its position-size, and the relation. For rendering this 2D bounding box in 3D, a constant third axis value is augmented with the predicted 2D positions to obtain the position triplet. Although the dataset does not provide explicit 3D relative positions, the model tends to perform reasonably well on relations involving humans/animals.

The subject (one object/entity), object (another object/entity), and relation words of the natural language scene description are embedded using 300-dimensional GloVe embeddings. A model is used with two hidden layers of 100 units each, a batch size of 64, RMSprop optimizer, a learning rate of 0.0001 and a mean-squared error loss for training. The training data consisted of 1.5 million samples and the validation set was 10% of this size. The model was trained for 15 epochs and the set of model parameters at the epoch with the least value of validation loss was chosen. The positions and sizes of the subject were normalized with respect to the size of the complete image. Given a subject-relation-object, the position and the size of the subject, the model predicts the position and size of the object.

Relations can be of two types, implicit and explicit. Implicit relations are those relations that do not include any positional information (such as riding, watching, playing), while explicit relations are those that include positional information (such as behind, on, in, etc.). This model is trained on implicit as well as explicit relations.

Figure 7A:
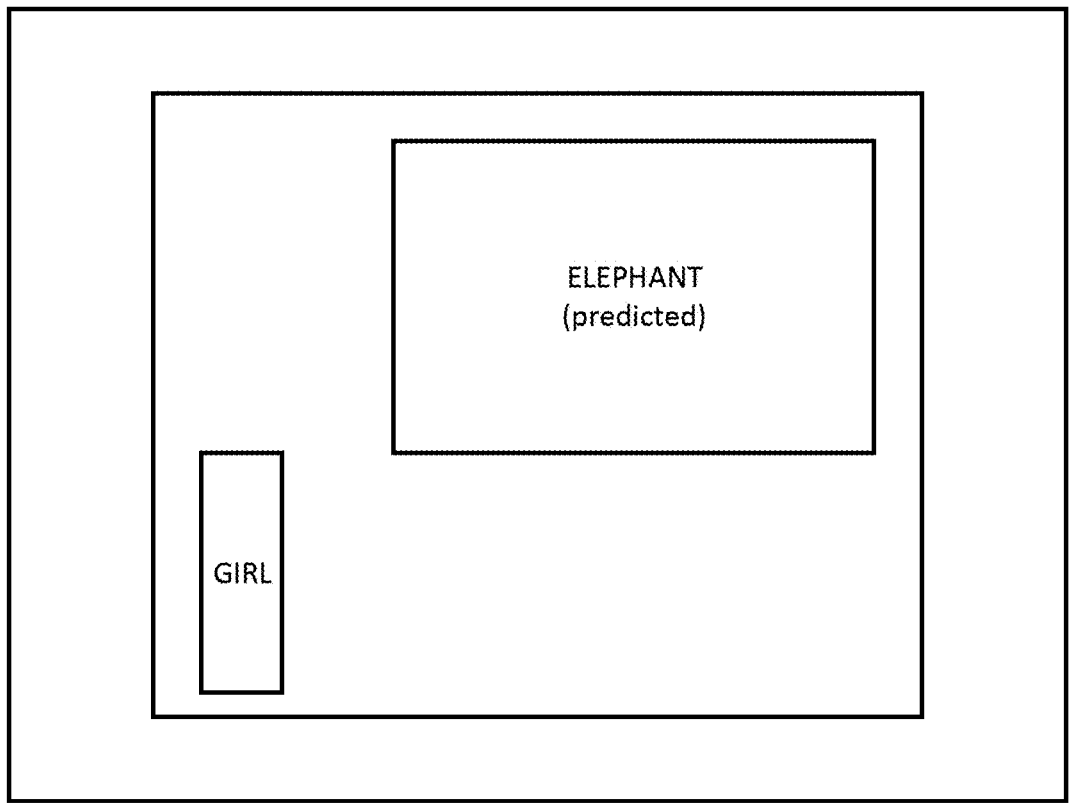
FIGS. 7A-7C show visualized examples of various human-object relation predictions, in accordance with some embodiments of the present disclosure.
Figure 7B:
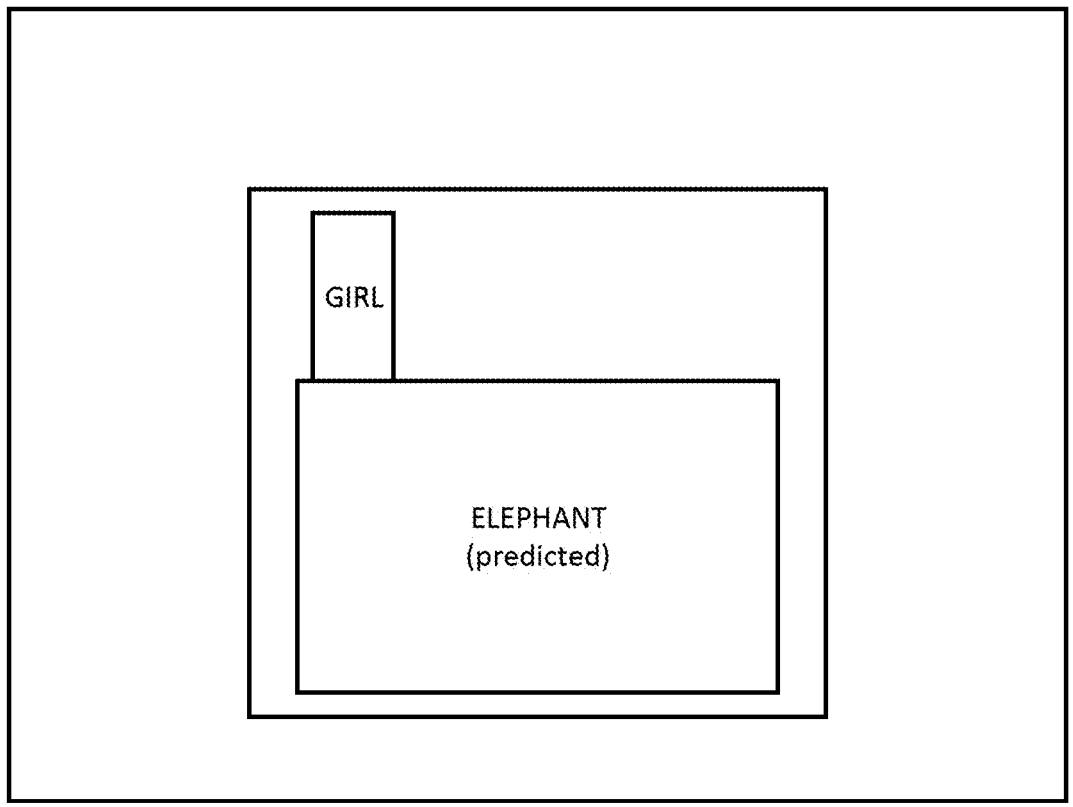
Figure 7C:
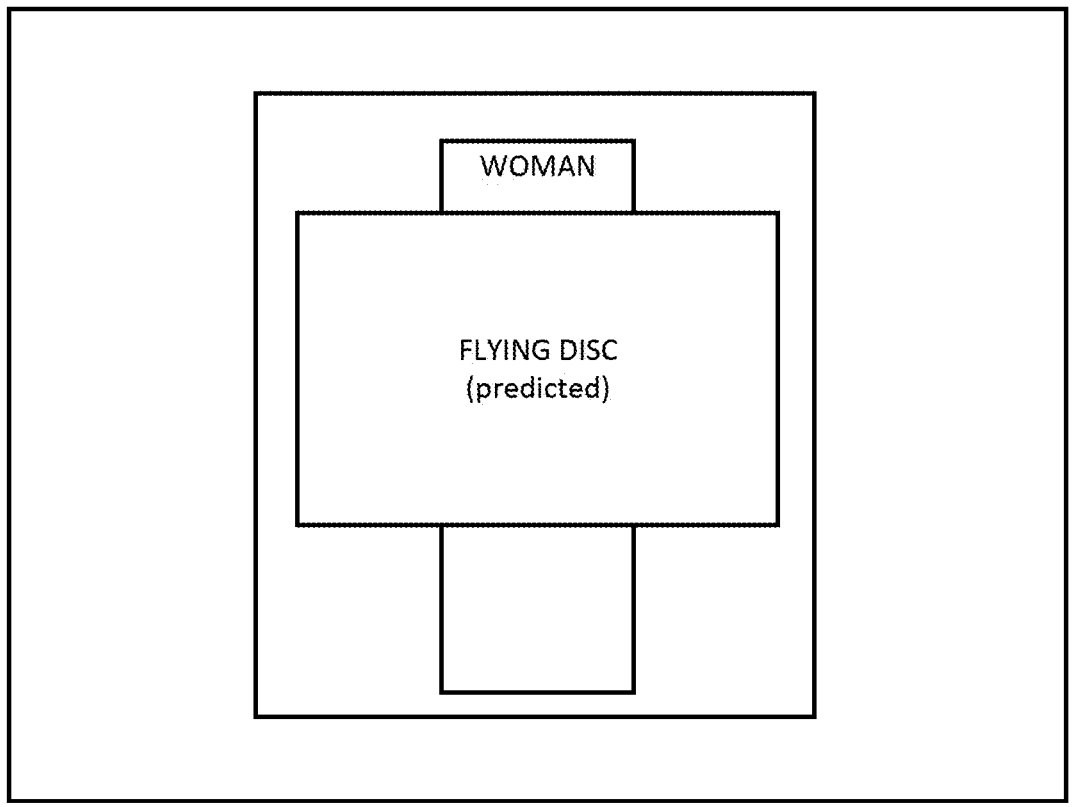

FIGS. 7A-7C show visualized examples of various human-object relation predictions, in accordance with embodiments of the present disclosure. FIG. 7A shows a visualized relation prediction of the relative size and the relative position of an elephant with respect to a girl, corresponding to the natural language scene description "girl watching elephant." FIG. 7B shows another visualized relation prediction of the relative size and the relative position of an elephant with respect to a girl, corresponding to the natural language scene description "girl riding elephant." FIG. 7C shows a visualized relation prediction of the relative size and the relative position of a flying disc with respect to a woman, corresponding to the natural language scene description "woman holding flying disc." These visualizations demonstrate how the models predict the relative sizes and the relative positions of objects for rendering in an AR scene.

b. Model for Object—Object Pair Prediction: To render objects in Augmented Reality, three dimensional positions and sizes are used. The above framework is extended to predict positions and sizes in three dimensions. A three-layered neural network trained on the Stanford Text2Scene dataset is used. This dataset contains 3D scenes, each scene containing objects annotated with 3D information defining the size and position of the objects. It also contains truth values (between 0 and 1, 1 indicating that the relation is completely true) for 22 pre-defined relations (such as 'in front of', 'near', 'inside', 'on top of', etc.) for every pair of objects in each scene.

When both the subject and the object are material things such as chair or table, the Stanford Text2Scene dataset, which describes 3D indoor scenes covering many commonplace objects, serves as comprehensive training data to directly learn a model to make 3D inferences. Hence, a three-layered neural network trained on the Stanford Text2Scene dataset can be used for relations involving only objects. This dataset contains 3D scenes, each scene containing a number of objects annotated with three dimensional bounding boxes. It also contains truth values (between 0 and 1 where 1 indicates that the relation is completely true) for 22 pre-defined explicit relations (such as 'in front of', 'near', 'inside', 'on top of', etc.) for every pair of objects in each scene. The model infers the relative position and size of the object, given subject-relation-object triple and size of the subject as input. In this model, the relations are limited to the 22 explicit relations defined in the dataset. The three hidden layers contain 300, 100 and 50 neurons respectively. Other parameters were same as in the setup for the previous model. The training was done for 300 epochs, with the best model being stored. Training data included 8.2 k subject-relation-object triples and 0.82 k triples for testing. As in the previous case, sizes were normalized with respect to the dimensions of the overall scene.

Figure 8A:
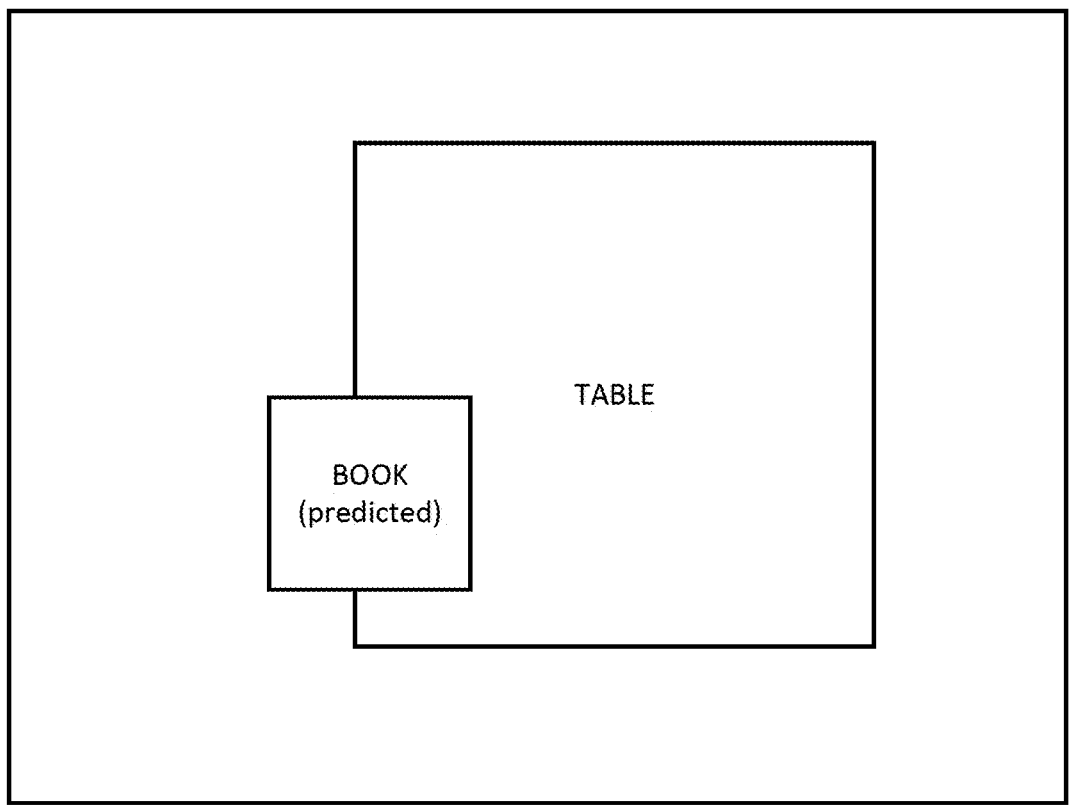
FIGS. 8A-8D show visualized examples of various object-object relation predictions, in accordance with some embodiments of the present disclosure.
Figure 8B:
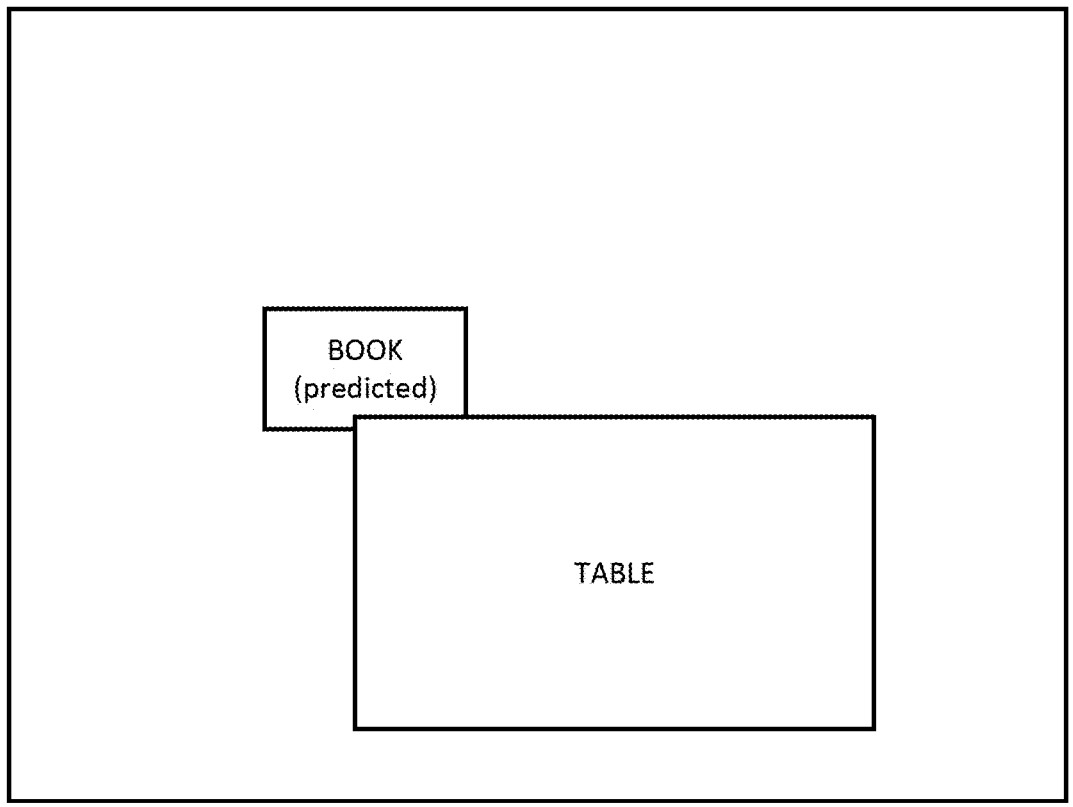
Figure 8C:
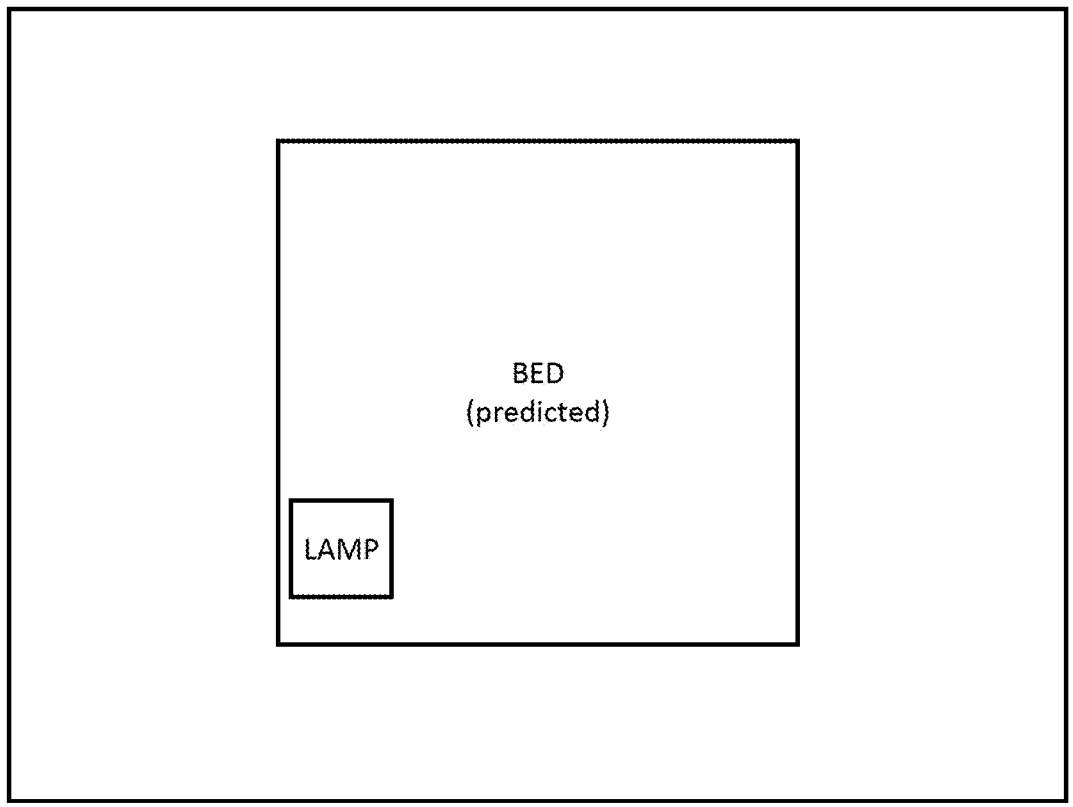
Figure 8D:
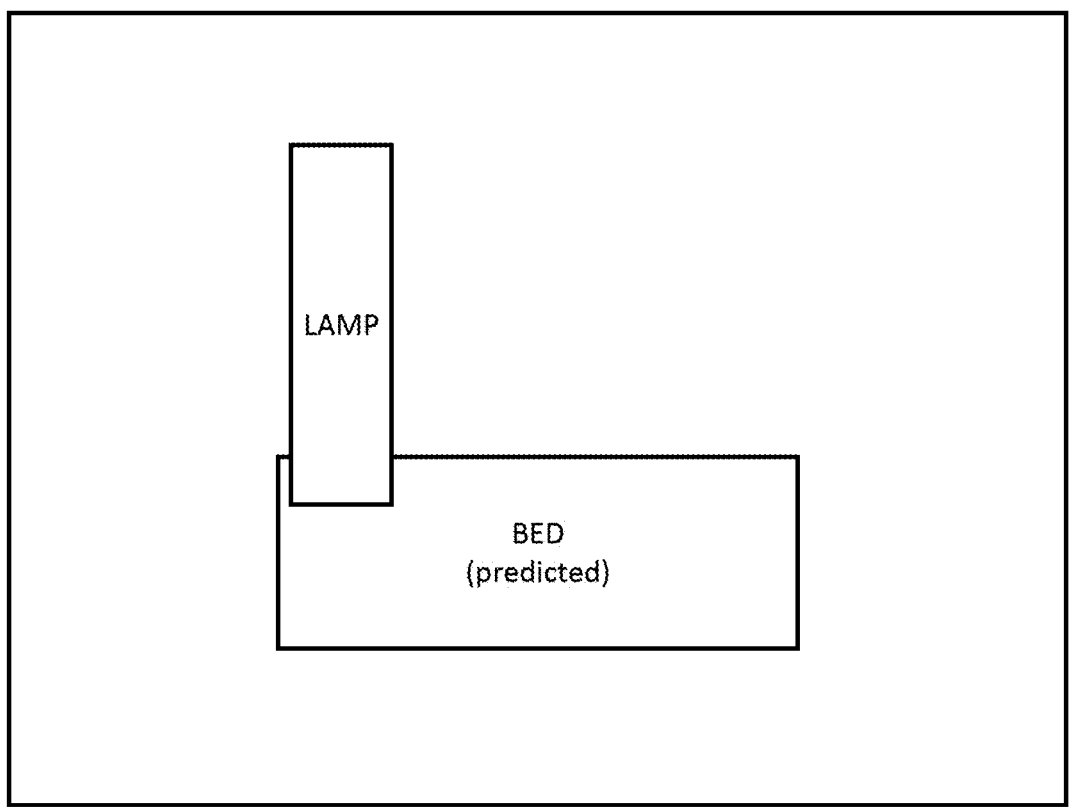

FIGS. 8A-8D show visualized examples of various object-object relation predictions, in accordance with embodiments of the present disclosure. FIGS. 8A and 8B show a visualized relation prediction (top and front views, respectively) of the relative size and the relative position of a book with respect to a table, corresponding to the natural language scene description "book on table." FIGS. 8C and 8D show a visualized relation prediction of the relative size and the relative position (top and front views, respectively) of a bed with respect to a lamp, corresponding to the natural language scene description "bed to front of lamp." These visualizations demonstrate how the models predict the relative sizes and the relative positions of objects for rendering in an AR scene.

Since objects are related for predicting their relative sizes and positions, as discussed in further detail below, disconnected components in the scene graph are merged by adding a single relation between two objects, one in each component. A single relation with the highest probability among all pairs of objects in the two components is chosen and added if it meets a preset threshold value. For this purpose, the Visual Genome dataset that contains scene graphs corresponding to commonplace images is used. A probabilistic method for augmenting the scene with additional objects and implicit relations is applied to the dataset.

Some metrics used for evaluation of the models include:
(a) IoU (Intersection over Union): IoU computes the overlap between the predicted and true sizes and positions.
(b) Centered IoU (Centered Intersection over Union): Centered IoU is the IoU computed assuming that the centers of the predicted and true ranges coincide. This removes the position component from the overlap calculation, and purely evaluates the goodness of size prediction.
(c) Pearson's Coefficient: Pearson's coefficient of correlation between the between the predicted position centers and the true position centers of the objects.
(d) RMSE (Root Mean Squared Error): This is the square root of the mean squared error between predicted position centers and the true position centers of the objects.

To increase the scope of the AR visualization, a background appropriate to the natural language scene description can be added, where the objects in the scene are characterized as part of foreground. The background includes things that cannot be depicted from objects, such as "city view." Returning to the example of "Jill is sitting in a playground," a background image of a playground can be added to the AR scene behind Jill and the bench.

Augmented Reality Front End

Figure 9:
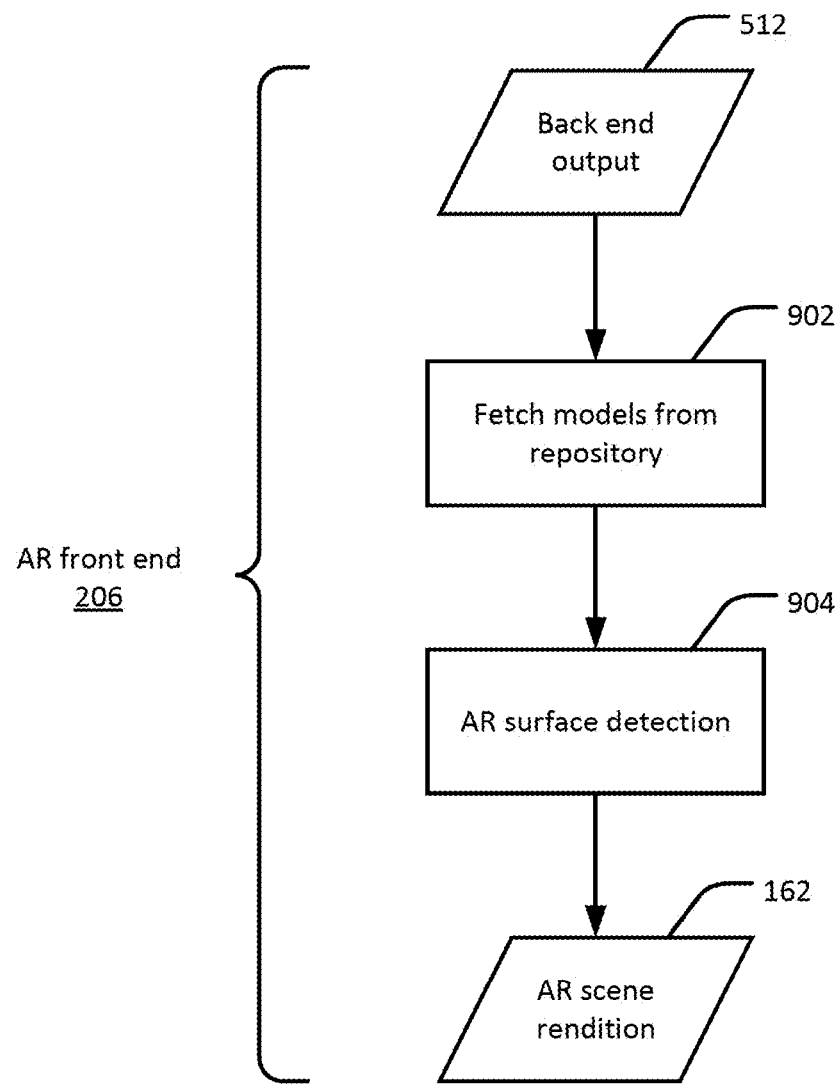
FIG. 9 is an example process flow diagram of the various steps involved in the rendition process of an AR front end, in accordance with an embodiment of the present disclosure.
Figure 10:
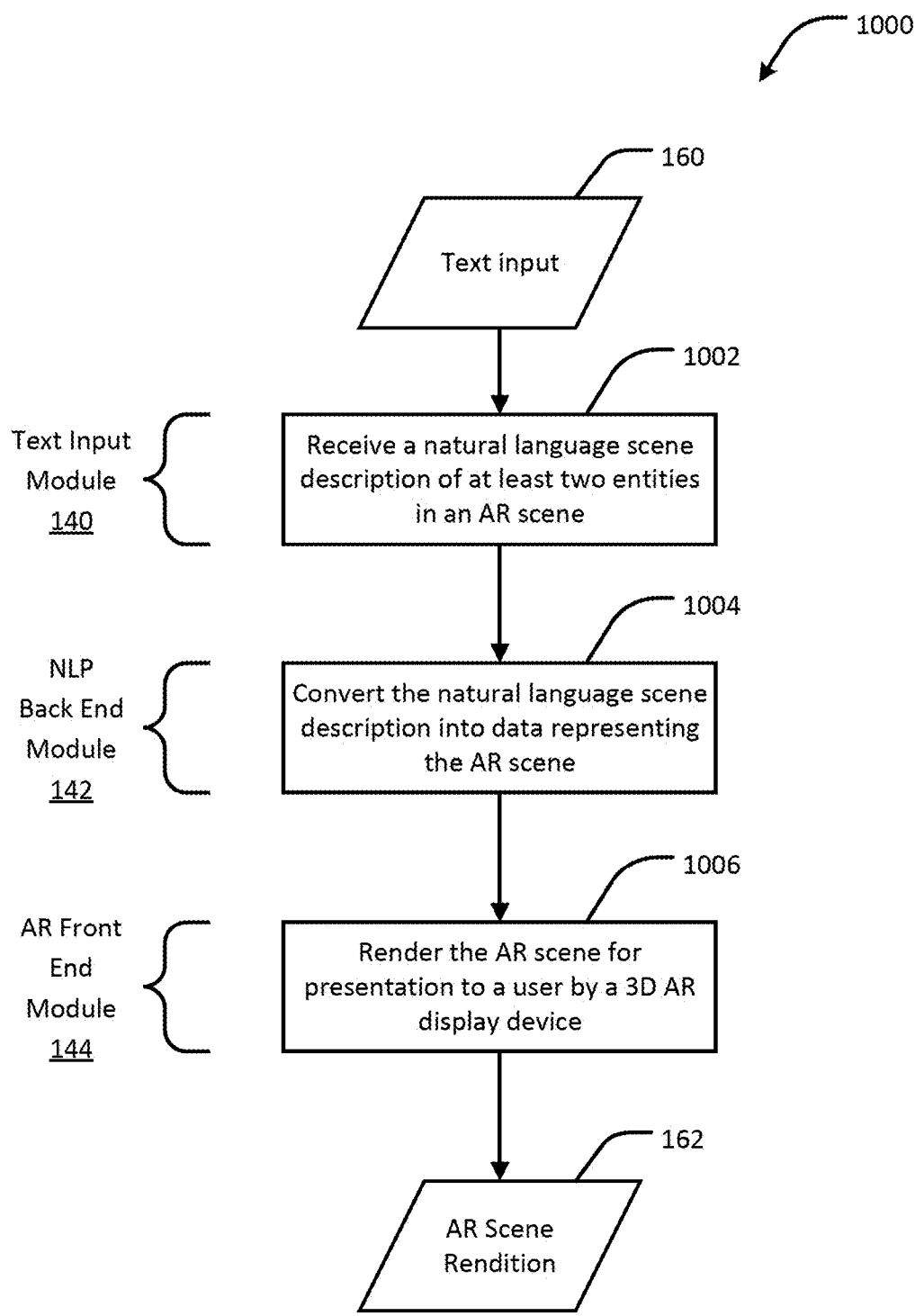
FIGS. 10-13 are flow diagrams of a process for processor-based conversion of a natural language scene description into a 3D scene in augmented reality, in accordance with some embodiments of the present disclosure.

FIG. 9 is an example process flow diagram of the various steps involved in the rendition process of the AR front end 206, in accordance with an embodiment of the present disclosure. The AR scene rendition 162 can, for example, be generated using the Google ARCore 4 library through the Unity3D 5 application. The information required to render the scene in AR is obtained from the NLP back end 204 and one or more models are fetched from a model repository 210 at step 902. The application detects various real surfaces on which the scene can be rendered at step 904. The user can select any flat surface by positioning the mobile phone accordingly. The objects are rendered at their desired positions and sizes, presenting an interactive AR experience to the user, as discussed in further detail below.

Scene Rendering a. Placement of objects: Using the prediction model described above, a single object whose position is manually fixed is used to predict the sizes and positions of other objects relative to it. This process is performed recursively to predict the position and size of each object from those of an object that has already been positioned either manually or through another relation, and then the scene is composed from these predictions.

To avoid overlap between objects, a simple heuristic is used for comparing the predicted size and location of the current object with the size and location of objects whose positions have been fixed and removing any overlap by shifting the object along the direction that requires the least possible shift (by magnitude).

b. Inferring Animations: To infer animations pertaining to humans described in the scene, the relations and attributes in the scene graph are used. Speech tags in the natural language scene description are used to infer actions performed by humans in the scene. A basic assumption is made that a verb relation or attribute on a human node indicates an action being performed by him or her. A word embedding-based similarity technique is used to calculate the similarity between the verb relation and each of the animation clips present in out repository. If a suitable animation that crosses a defined similarity threshold is found, the animation on the human is applied in the final scene. In cases where multiple animations cross the threshold, the highest animation to cross the threshold is selected.

c. Background Image Augmentation: In addition to the 3D scene, a 2D background is added to the scene to augment the 3D scene with extraneous complementary information. Based on the scene graph generated from the graph, background tags are extracted, and these tags are used to fetch a suitable image, which is retrieved through an API-based Google search. This image is stylized to blend with the AR scene and a plane with this image is placed behind the 3D scene to serve as the background to the scene.

The output from the back-end is in form of a schema (similar to JSON), containing the position, size and identity of the different scene components. This is used to fetch the relevant 3D models and images from the assets repository. Corresponding animations are also fetched. For final rendering, the user selects a surface in the scene for rendering. After the surface detection, the final 3D scene is rendered using the provided scene characteristics.

Example Methodologies

FIGS. 10-13 are flow diagrams of a process 1000 for processor-based conversion of a natural language scene description into a 3D scene in augmented reality, in accordance with embodiments of the present disclosure. The process 1000 can be implemented, for example, by the system 100 of FIG. 1. The process 1000 begins by receiving 1002, via a user interface of a computing device, a natural language scene description of a relation between at least two entities in an augmented reality scene. The entities can include inanimate objects as well as animate objects, such as humans or animals. The relation between the entities represents, for example, where the entities are positioned in the scene relative to each other and how the entities interact with each other. For example, as shown in FIG. 6, one relation between Jack and Jill is that Jack is talking to Jill. Another relation between Jack and Jill is that Jill is listening to Jack. Other relations can describe, for example, where Jack and Jill are located in the scene (e.g., on a hill), or the relative sizes of Jack and Jill (e.g., Jack is taller than Jill).

Figure 11:
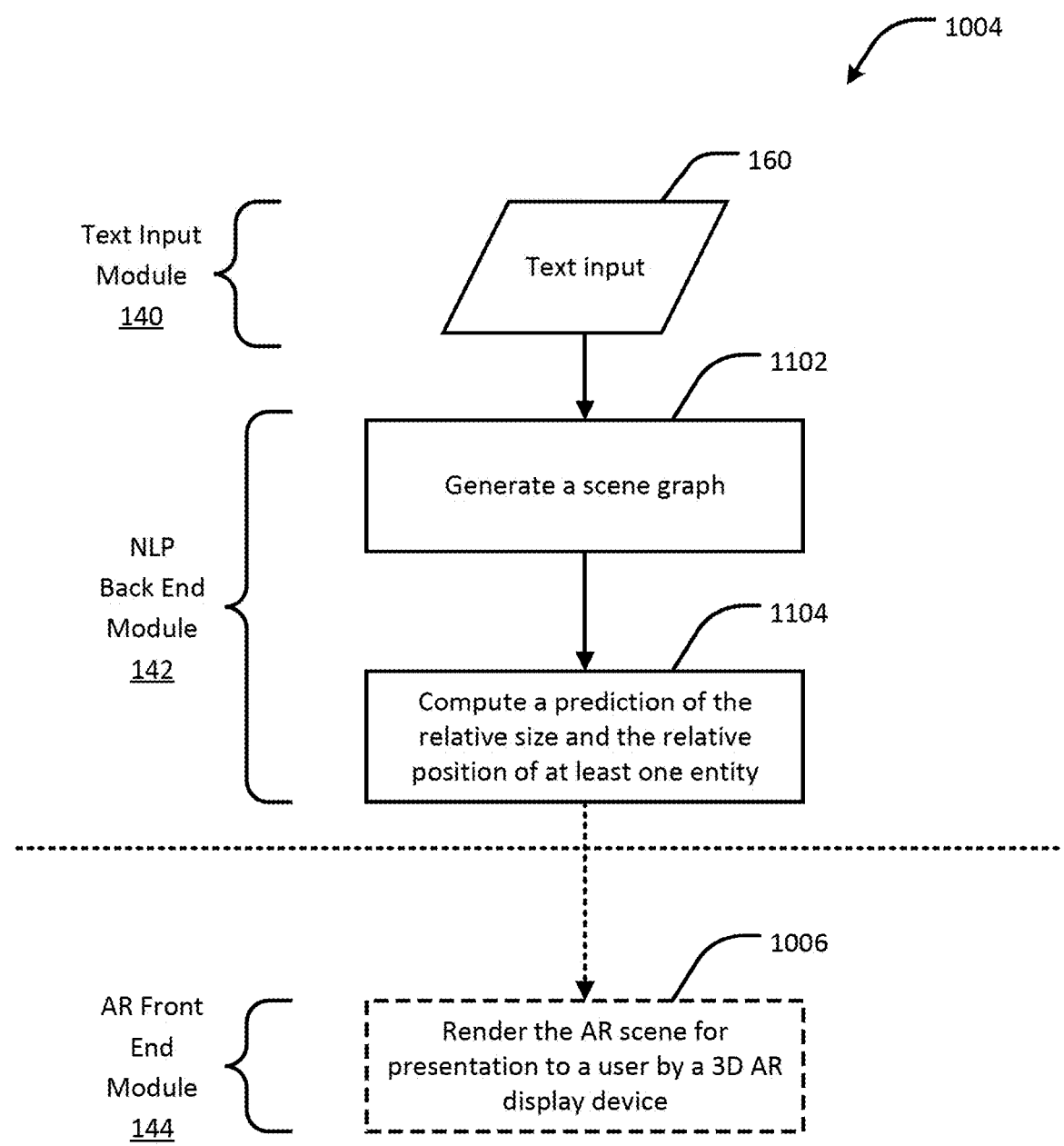

The method 1000 continues by converting 1004, by at least one processor of the computing device, the natural language scene description into data representing the augmented reality scene, the converting based at least in part on a model for predicting a relative size and a relative position of each of the entities using the relation between the respective entities. In some embodiments, as shown in FIG. 11, converting 1004 the natural language scene description into data representing the augmented reality scene includes generating 1102, by the at least one processor, a scene graph representing the relation between the entities in the augmented reality scene based on the natural language scene description. Referring again to FIG. 6, the scene graphs 608 and 610 are examples representing the entities in the natural language scene description and the relations between those entities. The converting 1004 further includes computing 1104 a prediction, by the at least one processor, of the relative size and the relative position of at least one of the entities using the model. FIGS. 7A-C and 8A-D, described above, show visualized examples of such relative size and relative position predictions, which are not necessarily explicit in the natural language scene description. For example, the model can predict that the elephant is larger than the girl even if the sizes of the elephant and the girl are not provided in the natural language scene description.

Figure 12:
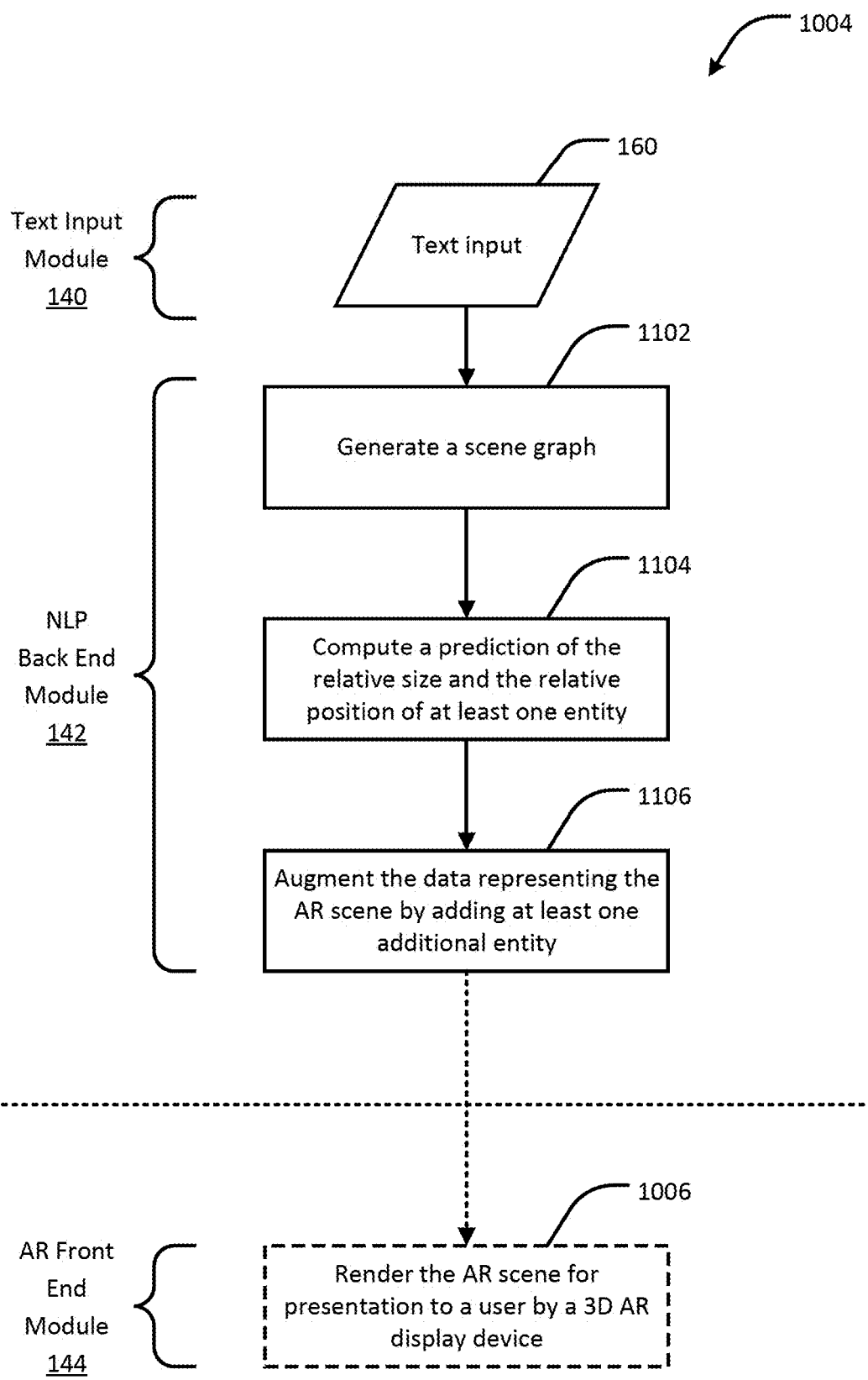

In some embodiments, as shown in FIG. 12, converting 1004 the natural language scene description into data representing the augmented reality scene includes augmenting 1106, by the at least one processor, the data representing the augmented reality scene by adding, to the data, at least one additional entity not described by the natural language scene description. A dataset, such as the Visual Genome dataset, can be used to obtain information that is missing from the scene graph.

Figure 13:
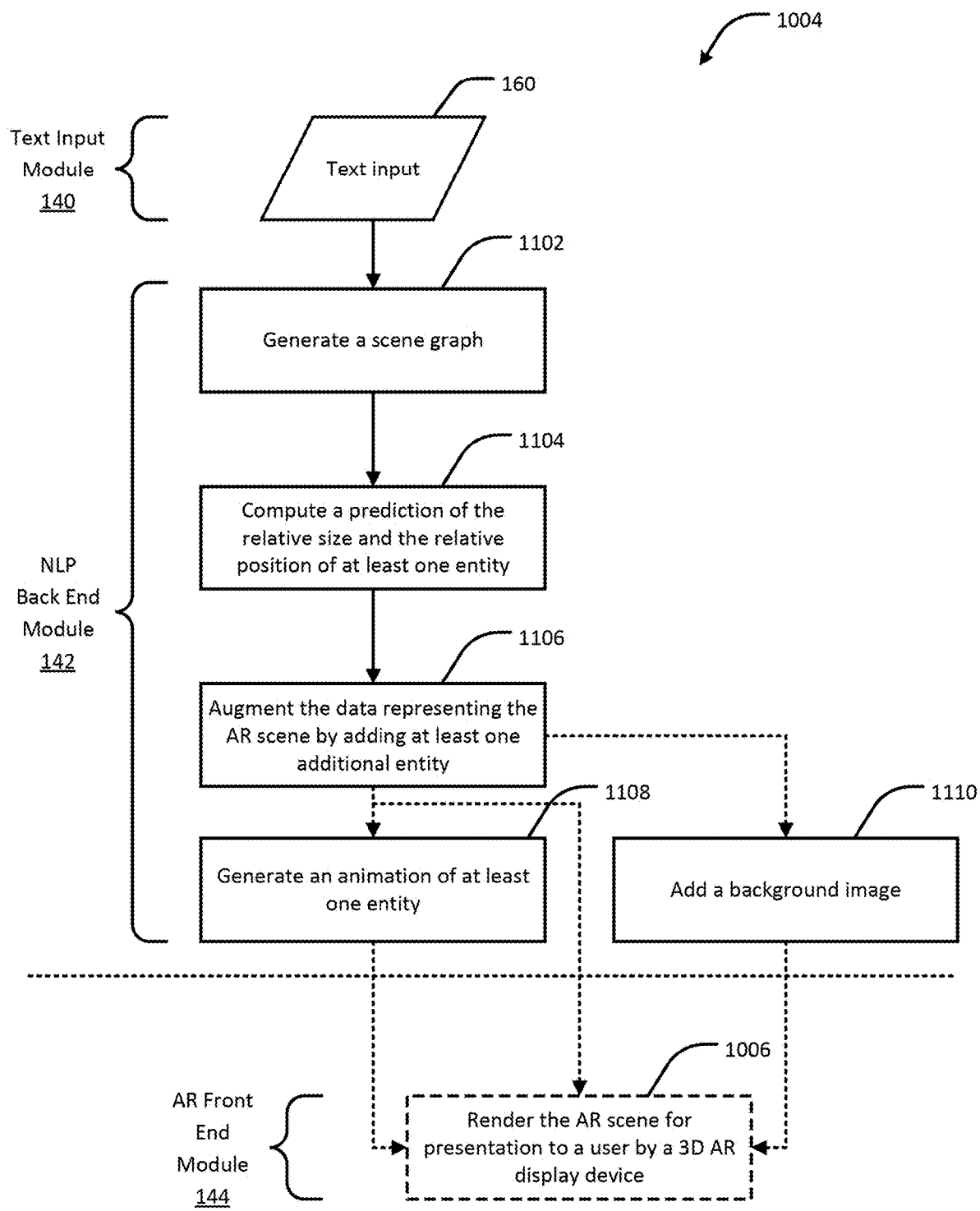

In some embodiments, as shown in FIG. 13, converting 1004 the natural language scene description into data representing the augmented reality scene includes generating 1108, by the at least one processor, an animation of at least one of the entities. For example, humanoid entities can be animated to move about the scene or to interact with the user, thereby enhancing the AR experience.

In some embodiments, as shown in FIG. 13, converting 1004 the natural language scene description into data representing the augmented reality scene includes adding 1110, by the at least one processor, a background image to the data representing the augmented reality scene based on the natural language description of the at least two entities in an augmented reality scene. For example, if the natural language description of the scene includes "playground," an image of a playground can be added as a background, thereby making the scene appear more realistic.

The process 1000 further includes rendering 1006, by the at least one processor, the augmented reality scene for presentation to a user by a 3D augmented reality display device, the augmented reality scene including the relative size and relative position of each respective one of the entities, the augmented entities (if any), and any animations and backgrounds. The result is an AR experience that can be easily created from a natural language description of the scene and enhanced using language-to-visual datasets and 3D object models.

Computing Device

Figure 14:
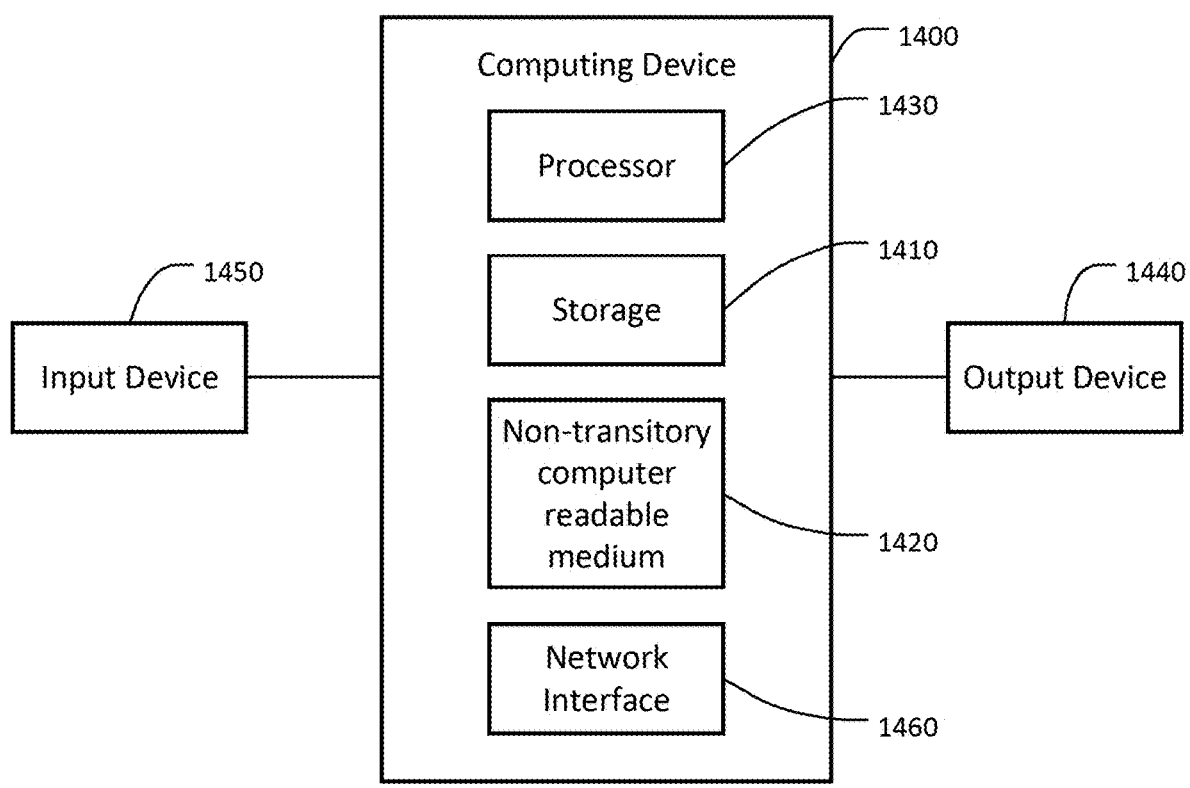
FIG. 14 is a block diagram representing an example computing device that may be used to perform any of the techniques as variously described in this disclosure.

FIG. 14 is a block diagram representing an example computing device 1400 that may be used to perform any of the techniques as variously described in this disclosure. For example, the system 100 of FIG. 1, or any portions thereof, and the methodologies of FIG. 2, 5, 10-13, or any portions thereof, may be implemented in the computing device 1400. The computing device 1400 may be any computer system, such as a workstation, desktop computer, server, laptop, handheld computer, tablet computer (e.g., the iPad® tablet computer), mobile computing or communication device (e.g., the iPhone® mobile communication device, the Android™ mobile communication device, and the like), VR device or VR component (e.g., headset, hand glove, camera, treadmill, etc.) or other form of computing or telecommunications device that is capable of communication and that has sufficient processor power and memory capacity to perform the operations described in this disclosure. A distributed computational system may be provided including a plurality of such computing devices.

The computing device 1400 includes one or more storage devices 1410 or non-transitory computer-readable media 1420 having encoded thereon one or more computer-executable instructions or software for implementing techniques as variously described in this disclosure. The storage devices 1410 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions or software that implement various embodiments as taught in this disclosure. The storage device 1410 may include other types of memory as well, or combinations thereof. The storage device 1410 may be provided on the computing device 1400 or provided separately or remotely from the computing device 1400. The non-transitory computer-readable media 1420 may include, but are not limited to, one or more types of hardware memory, non-transitory tangible media (for example, one or more magnetic storage disks, one or more optical disks, one or more USB flash drives), and the like. The non-transitory computer-readable media 1420 included in the computing device 1400 may store computer-readable and computer-executable instructions or software for implementing various embodiments. The computer-readable media 1420 may be provided on the computing device 1400 or provided separately or remotely from the computing device 1400.

The computing device 1400 also includes at least one processor 1430 for executing computer-readable and computer-executable instructions or software stored in the storage device 1410 or non-transitory computer-readable media 1420 and other programs for controlling system hardware. Virtualization may be employed in the computing device 1400 so that infrastructure and resources in the computing device 1400 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1400 through an output device 1440, such as a screen or monitor, including an augmented reality display device, which may display one or more user interfaces provided in accordance with some embodiments. The output device 1440 may also display other aspects, elements or information or data associated with some embodiments. The computing device 1400 may include other I/O devices 1450 for receiving input from a user, for example, a keyboard, a joystick, a game controller, a pointing device (e.g., a mouse, a user's finger interfacing directly with a touch-sensitive display device, etc.), or any suitable user interface, including an AR headset. The computing device 1400 may include other suitable conventional I/O peripherals. The computing device 1400 includes or is operatively coupled to various suitable devices for performing one or more of the aspects as variously described in this disclosure.

The computing device 1400 may run any operating system, such as any of the versions of Microsoft® Windows® operating systems, the different releases of the Unix® and Linux® operating systems, any version of the MacOS® for Macintosh computers, any embedded operating system, any real-time operating system, any open source operating system, any proprietary operating system, any operating systems for mobile computing devices, or any other operating system capable of running on the computing device 100 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having several input/output ports for receiving and outputting data, and several embedded routines for carrying out the functionality described in this disclosure. In a more general sense, any suitable combination of hardware, software, and firmware can be used, as will be apparent.

As will be appreciated in light of this disclosure, the various modules and components of the system, such as the Text-to-AR Scene Conversion Application 130, the Text Input Module 140, the Natural Language Processing (NLP) Back End Module 142, the Augmented Reality (AR) Front End Module 144, the GUI 150, or any combination of these, is implemented in software, such as a set of instructions (e.g., HTML, XML, C, C++, object-oriented C, JavaScript®, Java®, BASIC, etc.) encoded on any computer readable medium or computer program product (e.g., hard drive, server, disc, or other suitable non-transitory memory or set of memories), that when executed by one or more processors, cause the various methodologies provided in this disclosure to be carried out. It will be appreciated that, in some embodiments, various functions and data transformations performed by the user computing system, as described in this disclosure, can be performed by similar processors or databases in different configurations and arrangements, and that the depicted embodiments are not intended to be limiting. Various components of this example embodiment, including the computing device 400, may be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described herein can be combined in any number of configurations. One example embodiment provides a computer-implemented method of visualizing natural language in a three-dimensional (3D) augmented reality scene. The method includes receiving, via a user interface of a computing device, a natural language scene description of a relation between at least two entities in an augmented reality scene. The method further includes converting, by at least one processor of the computing device, the natural language scene description into data representing the augmented reality scene. The converting is based at least in part on a model trained, using pre-defined training data, to predict a relative size and a relative position of each of the entities using the relation between the respective entities. The method further includes causing the at least one processor to render the augmented reality scene for presentation to a user by a 3D augmented reality display device. The augmented reality scene includes the relative size and relative position of each respective one of the entities. In some cases, converting the natural language scene description into data representing the augmented reality scene includes generating, by the at least one processor, a scene graph representing the relation between the at least two entities in the augmented reality scene based on the natural language scene description, and computing a prediction, by the at least one processor, of the relative size and the relative position of at least one of the entities using the model. In some such cases, converting the natural language scene description into data representing the augmented reality scene further includes augmenting, by the at least one processor, the data representing the augmented reality scene by adding, to the data, at least one additional entity not described by the natural language scene description. In some such cases, converting the natural language scene description into data representing the augmented reality scene further includes generating, by the at least one processor, an animation of at least one of the entities. In some other such cases, converting the natural language scene description into data representing the augmented reality scene further includes adding, by the at least one processor, a background image to the data representing the augmented reality scene based on the natural language description of the at least two entities in an augmented reality scene. In some cases, at least one of the entities is an augmented reality representation of a physical object. In some such cases, at least another one of the entities is an augmented reality representation of a human or an animal. Another example embodiment provides a non-transitory computer program product having instructions encoded thereon that when executed by one or more computer processors cause the one or more computer processors to perform a process such as set forth in this paragraph.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A computer-implemented method of visualizing natural language in a three-dimensional (3D) augmented reality scene, the method comprising:
   receiving, via a user interface of a computing device, a textual natural language scene description of a relation between at least two entities in an augmented reality scene, the at least two entities including at least one virtual entity and at least one physical object in a real-world environment and viewable through a 3D augmented reality display device;
   converting, by at least one processor of the computing device, the natural language scene description into data representing the augmented reality scene, the converting based at least in part on a model trained, using pre-defined training data, to predict a relative size and a relative position of each of the entities using the relation between the respective entities; and
   causing the at least one processor to render the augmented reality scene for presentation to a user by the 3D augmented reality display device, the augmented reality scene including the relative size and relative position of each respective one of the entities.

2. The method of claim 1, wherein converting the natural language scene description into data representing the augmented reality scene includes
   generating, by the at least one processor, a scene graph representing the relation between the at least two entities in the augmented reality scene based on the natural language scene description; and
   computing a prediction, by the at least one processor, of the relative size and the relative position of at least one of the entities using the model.

3. The method of claim 2, wherein converting the natural language scene description into data representing the augmented reality scene further includes augmenting, by the at least one processor, the data representing the augmented reality scene by adding, to the data, at least one additional entity not described by the natural language scene description.

4. The method of claim 3, wherein converting the natural language scene description into data representing the augmented reality scene further includes generating, by the at least one processor, an animation of at least one of the entities.

5. The method of claim 3, wherein converting the natural language scene description into data representing the augmented reality scene further includes adding, by the at least one processor, a background image to the data representing the augmented reality scene based on the natural language description of the at least two entities in an augmented reality scene.

6. The method of claim 1, wherein at least one of the entities is an augmented reality representation of a physical object.

7. The method of claim 6, wherein at least another one of the entities is an augmented reality representation of a human or an animal.

8. A non-transitory computer readable medium having instructions encoded thereon that when executed by at least one processor of a computing device cause the at least one processor to perform a process of converting a textual natural language scene description into an augmented reality scene to be rendered, the process comprising:
   receiving, via a user interface of the computing device, the textual natural language scene description of a relation between at least two entities in an augmented reality scene, the at least two entities including at least one virtual entity and at least one physical object in a real-world environment and viewable through a 3D augmented reality display device;
   converting, by at least one processor of the computing device, the natural language scene description into data representing the augmented reality scene, the converting based at least in part on a model trained, using pre-defined training data, to predict a relative size and a relative position of each of the entities using the relation between the respective entities; and
   causing the at least one processor to render the augmented reality scene for presentation to a user by the 3D augmented reality display device, the augmented reality scene including the relative size and relative position of each respective one of the entities.

9. The non-transitory computer readable medium of claim 8, wherein converting the natural language scene description into data representing the augmented reality scene includes
   generating, by the at least one processor, a scene graph representing the relation between the at least two entities in the augmented reality scene based on the natural language scene description; and
   computing a prediction, by the at least one processor, of the relative size and the relative position of at least one of the entities using the model.

10. The non-transitory computer readable medium of claim 9, wherein converting the natural language scene description into data representing the augmented reality scene further includes augmenting, by the at least one processor, the data representing the augmented reality scene by adding, to the data, at least one additional entity not described by the natural language scene description.

11. The non-transitory computer readable medium of claim 10, wherein converting the natural language scene description into data representing the augmented reality scene further includes generating, by the at least one processor, an animation of at least one of the entities.

12. The non-transitory computer readable medium of claim 10, wherein converting the natural language scene description into data representing the augmented reality scene further includes adding, by the at least one processor, a background image to the data representing the augmented reality scene based on the natural language description of the at least two entities in an augmented reality scene.

13. The non-transitory computer readable medium of claim 8, wherein at least one of the entities is an augmented reality representation of a physical object.

14. The non-transitory computer readable medium of claim 13, wherein at least another one of the entities is an augmented reality representation of a human or an animal.

15. A system for digitally modifying a video, the system comprising:
- a storage; and
- a processor operatively coupled to the storage, the processor configured to execute instructions stored in the storage that when executed cause the processor to carry out a process including
- receiving, via a user interface, a textual natural language scene description of a relation between at least two entities in an augmented reality scene, the at least two entities including at least one virtual entity and at least one physical object in a real-world environment and viewable through a 3D augmented reality display device;
- converting the natural language scene description into data representing the augmented reality scene, the converting based at least in part on a model trained, using pre-defined training data, to predict a relative size and a relative position of each of the entities using the relation between the respective entities; and
- causing the augmented reality scene to be rendered for presentation to a user by the 3D augmented reality display device, the augmented reality scene including the relative size and relative position of each respective one of the entities.

16. The system of claim 15, wherein converting the natural language scene description into data representing the augmented reality scene includes
- generating a scene graph representing the relation between the at least two entities in the augmented reality scene based on the natural language scene description; and
- computing a prediction of the relative size and the relative position of at least one of the entities using the model.

17. The system of claim 16, wherein converting the natural language scene description into data representing the augmented reality scene further includes augmenting the data representing the augmented reality scene by adding, to the data, at least one additional entity not described by the natural language scene description.

18. The system of claim 17, wherein converting the natural language scene description into data representing the augmented reality scene further includes generating an animation of at least one of the entities.

19. The system of claim 17, wherein converting the natural language scene description into data representing the augmented reality scene further includes adding, by the at least one processor, a background image to the data representing the augmented reality scene based on the natural language description of the at least two entities in an augmented reality scene.

20. The system of claim 15, wherein at least one of the entities is an augmented reality representation of a physical object, and wherein at least another one of the entities is an augmented reality representation of a human or an animal.

* * * * *